(12) United States Patent
Hasegawa et al.

(10) Patent No.: US 12,302,376 B2
(45) Date of Patent: May 13, 2025

(54) WIRELESS COMMUNICATION DEVICE, WIRELESS COMMUNICATION SYSTEM, CONTROL CIRCUIT, STORAGE MEDIUM, AND WIRELESS COMMUNICATION METHOD

(71) Applicant: Mitsubishi Electric Corporation, Tokyo (JP)

(72) Inventors: Fumihiro Hasegawa, Tokyo (JP); Shigenori Tani, Tokyo (JP); Nobuyoshi Horie, Tokyo (JP); Hiroyasu Sano, Tokyo (JP); Yoshihisa Kagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 424 days.

(21) Appl. No.: 17/745,064

(22) Filed: May 16, 2022

(65) Prior Publication Data
US 2022/0279534 A1 Sep. 1, 2022

Related U.S. Application Data

(63) Continuation of application No. PCT/JP2020/003250, filed on Jan. 29, 2020.

(51) Int. Cl.
*H04W 72/542* (2023.01)
*H04W 72/20* (2023.01)
*H04W 72/30* (2023.01)

(52) U.S. Cl.
CPC ......... *H04W 72/542* (2023.01); *H04W 72/20* (2023.01); *H04W 72/30* (2023.01)

(58) Field of Classification Search
CPC ..... H04W 48/20; H04W 48/16; H04W 12/06; H04W 76/10; H04W 84/12; H04W 92/08;
(Continued)

(56) References Cited

U.S. PATENT DOCUMENTS 11,722,952 B2 * 8/2023 Zhang .................... H04B 7/088
370/328
11,729,842 B2 * 8/2023 Ryu ....................... H04W 16/28
370/328

(Continued)

FOREIGN PATENT DOCUMENTS

WO WO-2018232743 A1 * 12/2018

OTHER PUBLICATIONS

3GPP, "3rd Generation Partnership Project; Technical Specification Group Radio Access Network; NR; Multiplexing and channel coding (Release 15)," 3GPP TS 38.212, V15.7.0, Sep. 2019, pp. 1-101.

(Continued)

*Primary Examiner* — Farid Seyedvosoghi
(74) *Attorney, Agent, or Firm* — BIRCH, STEWART, KOLASCH & BIRCH, LLP

(57) ABSTRACT

A wireless communication device includes a transmission processing unit communicable with each of multiple communication peer devices through switching between beam directions in a time division manner, and a control unit that allows beam information representing how beams are used by the multiple communication peer devices with which the transmission processing unit is communicable to be shared by the multiple communication peer devices.

17 Claims, 16 Drawing Sheets

(58) Field of Classification Search
CPC ....... H04W 4/50; H04W 24/02; H04W 88/08; H04W 72/542; H04W 72/20; H04W 72/30; H04W 8/005; F25D 29/005; F25D 29/00; F25D 2400/361; H04L 63/083; H04L 67/12; H04M 1/72415; H04B 7/0695

See application file for complete search history.

(56) References Cited

U.S. PATENT DOCUMENTS

| | | | | |
|---|---|---|---|---|
| 2013/0163544 | A1* | 6/2013 | Lee | H04B 7/0617 370/329 |
| 2013/0301454 | A1 | 11/2013 | Seol et al. | |
| 2018/0159603 | A1 | 6/2018 | Kim et al. | |
| 2018/0323850 | A1* | 11/2018 | Baligh | H04W 36/0094 |
| 2020/0359357 | A1* | 11/2020 | Yasukawa | H04B 7/0695 |
| 2020/0374960 | A1* | 11/2020 | Deenoo | H04B 7/0695 |
| 2020/0382967 | A1* | 12/2020 | Yamada | H04W 16/28 |
| 2022/0022182 | A1* | 1/2022 | Michalopoulos | H04W 72/51 |
| 2023/0121925 | A1* | 4/2023 | Da Silva | H04W 72/0453 370/329 |

OTHER PUBLICATIONS

3GPP, "3rd Generation Partnership Project; Technical Specification Group Radio Access Network; NR; Physical channels and modulation (Release 15)," 3GPP TS 38.211, V15.7.0, Sep. 2019, pp. 1-97.
3GPP, "3rd Generation Partnership Project; Technical Specification Group Radio Access Network; NR; Physical layer procedures for data (Release 15)," 3GPP TS 38.214, V15.7.0, Sep. 2019, pp. 1-106.
European Communication pursuant to Article 94(3) EPC for European Application No. 20 916 538.0. dated Jul. 25, 2023.
European Communication pursuant to Article 94(3) EPC for European Application No. 20 916 538.0, dated Jun. 26, 2024.
European Communication pursuant to Article 94(3) EPC for corresponding European Application No. 20916538.0, dated Dec. 15, 2023.
Extended European Search Report for European Application No. 20916538.0 dated Nov. 25, 2022.
Chinese Office Action and Search Report for Chinese Application No. 202080093705.6, dated Jun. 30, 2023, with an English translation of the Chinese Office Action.
European Communication pursuant to Article 94(3) EPC for European Application No. 20916538.0; dated Feb. 4, 2025.

* cited by examiner

WIRELESS COMMUNICATION DEVICE, WIRELESS COMMUNICATION SYSTEM, CONTROL CIRCUIT, STORAGE MEDIUM, AND WIRELESS COMMUNICATION METHOD

CROSS-REFERENCE TO RELATED APPLICATION

This application is a continuation application of International Application PCT/JP2020/003250, filed on Jan. 29, 2020, and designating the U.S., the entire contents of which are incorporated herein by reference.

BACKGROUND OF THE INVENTION

1. Field of the Invention

The present disclosure relates to a wireless communication device communicable with each of multiple communication peer devices through switching between beam directions in a time division manner, to a wireless communication system, to a control circuit, to a storage medium, and to a wireless communication method.

2. Description of the Related Art

A technology known as beam forming has been used in the field of wireless communication in recent years, in which a narrow beam is formed using a multi-element antenna to concentrate transmitted power in the transmission direction. For example, as described in "3GPP, "Physical layer procedures for data (Release 15)", TS 38.214, version 15.7.0, 2019-09" of Non Patent Literature 1, beam forming technology is also employed in New Radio (NR) that has been standardized in 3GPP Release 15 for fifth generation mobile communication systems.

When a wireless communication device that utilizes beam forming technology communicates with multiple communication peer devices, the wireless communication device needs to determine the beam direction to be used in the communication with each of the multiple communication peer devices, and to notify each of the multiple communication peer devices of the beam direction. In addition, a wireless communication device that utilizes beam forming technology achieves a higher electricity usage efficiency in communication using transmitted power concentrated in a single beam direction through switching of the beam direction to the direction of the communication peer device in a time division manner than in communication with the multiple communication peer devices simultaneously using multiple beams. This requires the wireless communication device to notify each of the multiple communication peer devices of timing of beam emission to a corresponding one of the multiple communication peer devices.

For example, consider a system including a wireless communication device communicating with three communication peer devices using beam forming technology. Let the three communication peer devices be referred to respectively as a first communication peer device, a second communication peer device, and a third communication peer device. The wireless communication device notifies the first communication peer device of first beam information representing the beam direction for use in communication with the first communication peer device, and timing of beam emission to the first communication peer device. The wireless communication device notifies the second communication peer device of second beam information representing the beam direction for use in communication with the second communication peer device, and timing of beam emission to the second communication peer device. The wireless communication device notifies the third communication peer device of third beam information representing the beam direction for use in communication with the third communication peer device, and timing of beam emission to the third communication peer device. The first communication peer device, the second communication peer device, and the third communication peer device each direct the reception beam into alignment with the beam direction notification of which is provided, at the timing of beam emission notification of which is provided.

However, according to the foregoing conventional technology, each of the multiple communication peer devices can know which beam to use in communication with the wireless communication device, but cannot know how beams are used by the other communication peer devices. This presents a problem of occurrence of interference between beams of multiple communication peer devices, which may reduce communication quality.

SUMMARY OF THE INVENTION

In order to solve the above problem and achieve the object, a wireless communication device according to the present disclosure includes: a transmission processing unit communicable with each of a plurality of communication peer devices through switching between beam directions in a time division manner; and a control unit to allow beam information representing how beams are used by the plurality of communication peer devices with which the transmission processing unit is communicable to be shared by the plurality of communication peer devices.

DETAILED DESCRIPTION OF THE PREFERRED EMBODIMENTS

A wireless communication device, a wireless communication system, a control circuit, a storage medium, and a wireless communication method according to embodiments of the present disclosure will be described in detail below with reference to the drawings. Note that the following embodiments are not intended to limit the technical scope of the present disclosure.

First Embodiment

Figure 1:
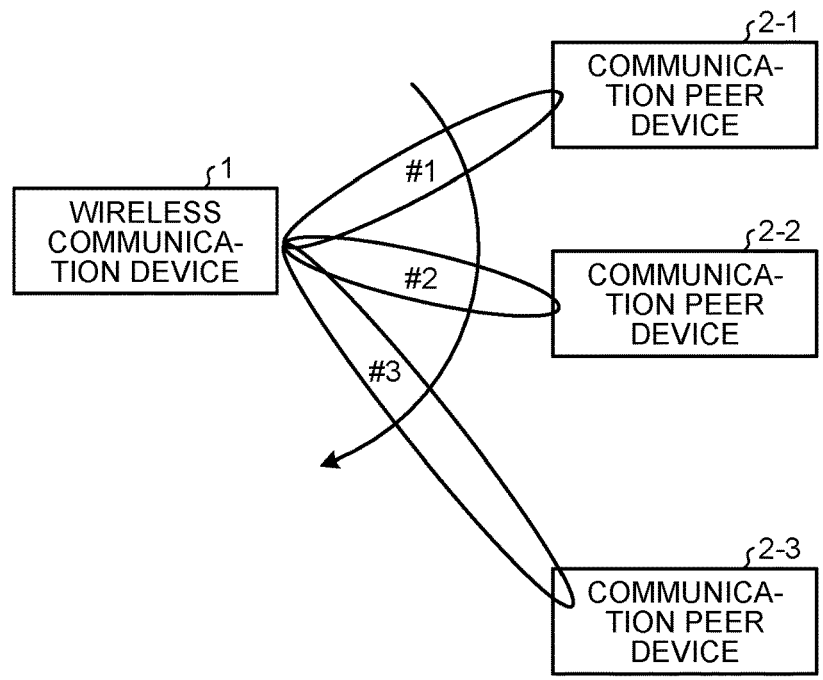
FIG. 1 is a diagram for describing communication using beam forming technology.

FIG. 1 is a diagram for describing communication using beam forming technology. A wireless communication device 1 is communicable with each of multiple communication peer devices 2-1, 2-2, and 2-3 using beam forming technology. When no distinction needs to be made, the multiple communication peer devices 2-1, 2-2, and 2-3 are each hereinafter referred to simply as communication peer device 2. The wireless communication device 1 is capable of transmitting a data signal, control information, and the like to each of the multiple communication peer devices 2 through switching between directions of the beam in a time division manner. For example, the wireless communication device 1 sequentially switches, in a time division manner, the direction of the beam in the order of beam direction #1 toward the communication peer device 2-1, beam direction #2 toward the communication peer device 2-2, and beam direction #3 toward the communication peer device 2-3.

Before starting communication using beam forming technology, the wireless communication device 1 needs to determine beam direction #1, beam direction #2, and beam direction #3 that are respectively toward the communication peer devices 2-1, 2-2, and 2-3. The wireless communication device 1 sends a signal such as a reference signal in multiple directions through switching of the direction of the beam, while the communication peer device 2 measures received power of the signal transmitted using each beam. The wireless communication device 1 then determines the direction of the beam to be used in communication with each of the communication peer devices 2 based on the received power measured. The wireless communication device 1 notifies the communication peer device 2 of beam information representing the direction of the beam to be used in communication with that communication peer device 2 and the timing of emission to the communication peer device 2. This enables the communication peer device 2 to direct the reception beam into alignment with the beam direction notification of which is provided, at the timing of emission notification of which is provided.

The wireless communication device 1 usually notifies the communication peer device 2-1 of beam information for use in communication with the communication peer device 2-1, the communication peer device 2-2 of beam information for use in communication with the communication peer device 2-2, and the communication peer device 2-3 of beam information for use in communication with the communication peer device 2-3. In this case, each of the multiple communication peer devices 2 cannot know the beam directions or emission timings used by the other communication peer devices 2. For example, the communication peer device 2-1 cannot know the beam direction or emission timing used by the communication peer device 2-2 or 2-3. In the present embodiment, in contrast, the wireless communication device 1 enables the multiple communication peer devices 2-1, 2-2, and 2-3 to share beam information representing how beams are used by the multiple communication peer devices 2-1, 2-2, and 2-3, with which the wireless communication device 1 is communicable. Thus, each of the multiple communication peer devices 2 can know how beams are used by the other communication peer devices 2.

Note that the wireless communication device 1 and the communication peer devices 2 may each be any type of a communication device. The wireless communication device 1 and the communication peer devices 2 are each a communication device such as a base station, a terminal, or a high altitude platform station (HAPS). In addition, when a single communication device includes multiple receiving panels, each of the multiple receiving panels can be regarded as one communication peer device. A HAPS is a communication device floating or flying at a location above the ground, and usually refers to a communication device floated or flying in the stratosphere, such as one known as a satellite, an airplane, or a balloon. The HAPS described in the following examples is not limited to a communication device floated or flying in the stratosphere, but may also be applicable to a communication device floated or flying at a location below the stratosphere. There is no particular limitation on a combination of types of the communication devices. For example, the wireless communication device 1 may be a base station, and the communication peer devices 2 may each be a terminal. The wireless communication device 1 and the communication peer devices 2 may each be a base station. The wireless communication device 1 and the communication peer devices 2 may each be a terminal. Alternatively, the wireless communication device 1 may be a HAPS, and the communication peer devices 2 may each be a base station. Specific examples will be described in the following description.

Figure 2:
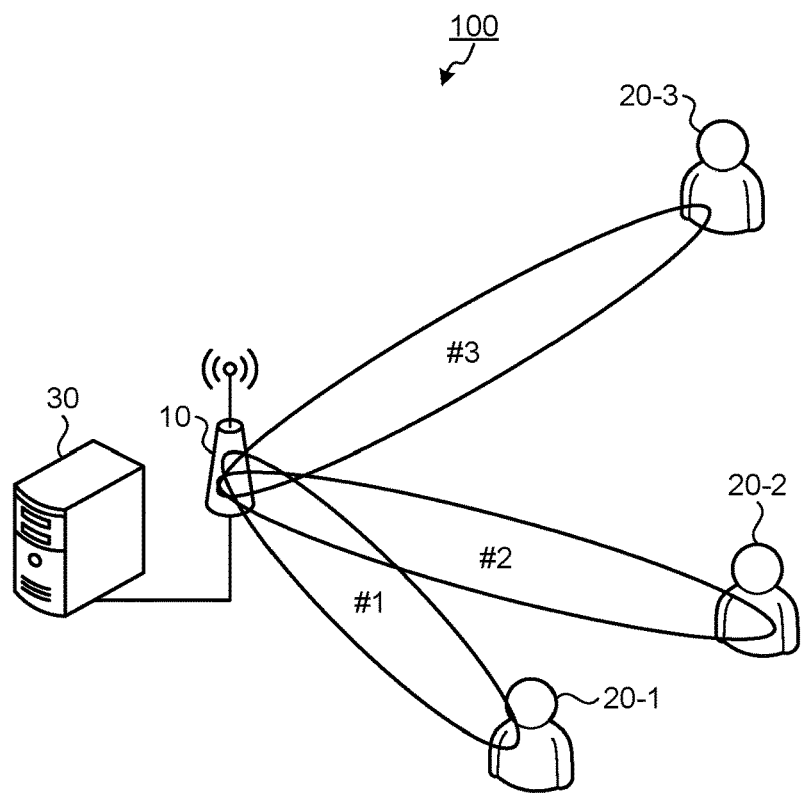
FIG. 2 is a diagram illustrating a configuration of a wireless communication system according to a first embodiment.

FIG. 2 is a diagram illustrating a configuration of a wireless communication system 100 according to a first embodiment. The wireless communication system 100 includes a base station 10, multiple terminals 20-1, 20-2, and 20-3, and a server 30. When no distinction needs to be made, the terminals 20-1, 20-2, and 20-3 are each hereinafter referred to simply as terminal 20. The base station 10 is an example of the wireless communication device 1, and the terminals 20 are each an example of the communication peer device 2.

The terminals 20-1, 20-2, and 20-3 are located in the coverage area of the base station 10. The base station 10 is capable of directing a beam in the direction of each of the three terminals 20-1, 20-2, and 20-3 to communicate with each of the three terminals 20-1, 20-2, and 20-3. In this operation, the base station 10 communicates with the three terminals 20-1, 20-2, and 20-3 at respective timings different from one another through switching between beam directions in a time division manner.

Figure 3:
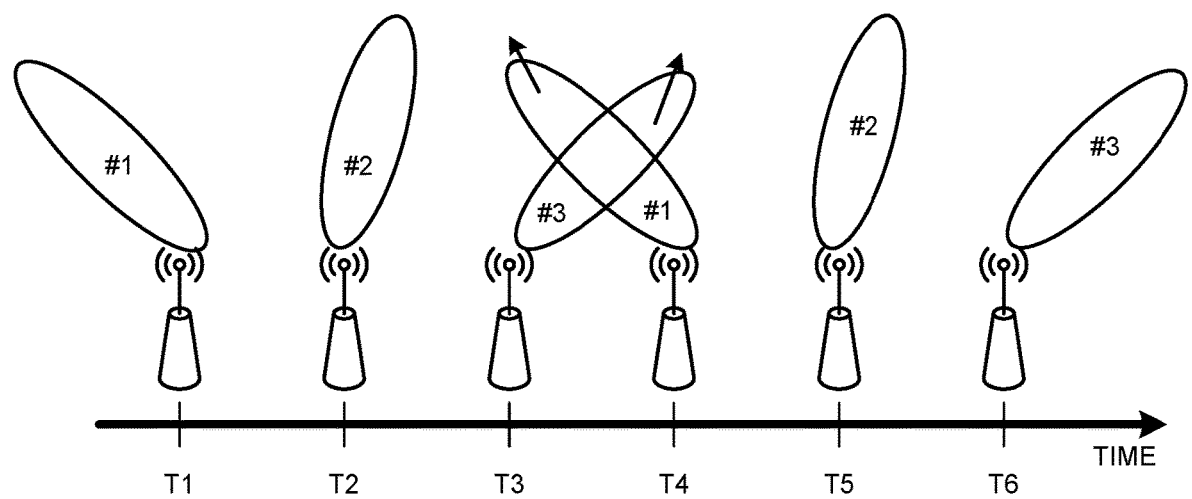
FIG. 3 is a diagram illustrating emission timings of the base station illustrated in FIG. 2.

FIG. 3 is a diagram illustrating emission timings of the base station 10 illustrated in FIG. 2. Times T1 to T6, which are times different from one another, each indicate an emission timing of the base station 10. The horizontal axis of FIG. 3 represents time in units of, for example, hours, minutes, or seconds; or symbols, slots, or subframes specified by 3GPP and/or the like. At time T1, the base station 10 directs the beam to beam direction #1 toward the terminal 20-1. At time T2, the base station 10 directs the beam to beam direction #2 toward the terminal 20-2. At time T3, the base station 10 directs the beam to beam direction #3 toward the terminal 20-3. Also at time T4 and thereafter, the beam direction is switched from one to another repeatedly in a similar manner.

Note that FIGS. 2 and 3 assume that the base station 10 switches between beam directions on a per-terminal 20 basis, but the present embodiment is not limited to such an example. In a case in which a single terminal 20 includes multiple receiving panels, the base station 10 may regard each receiving panel as a separate communication peer device 2, and then switch between beam directions on a per-receiving panel basis.

Each of the multiple terminals 20 directs the reception beam toward the base station 10 in synchronization with when a beam is directed to that terminal 20 from the base station 10. Because each of the terminals 20 is notified of beam information from the base station 10, each of the terminals 20 directs the reception beam to the base station 10 into alignment with the beam direction notification of which is provided, at the emission timing indicated in the beam information. For example, the terminal 20-1 directs the reception beam into alignment with beam direction #1 at time T1 and time T4.

Figure 4:
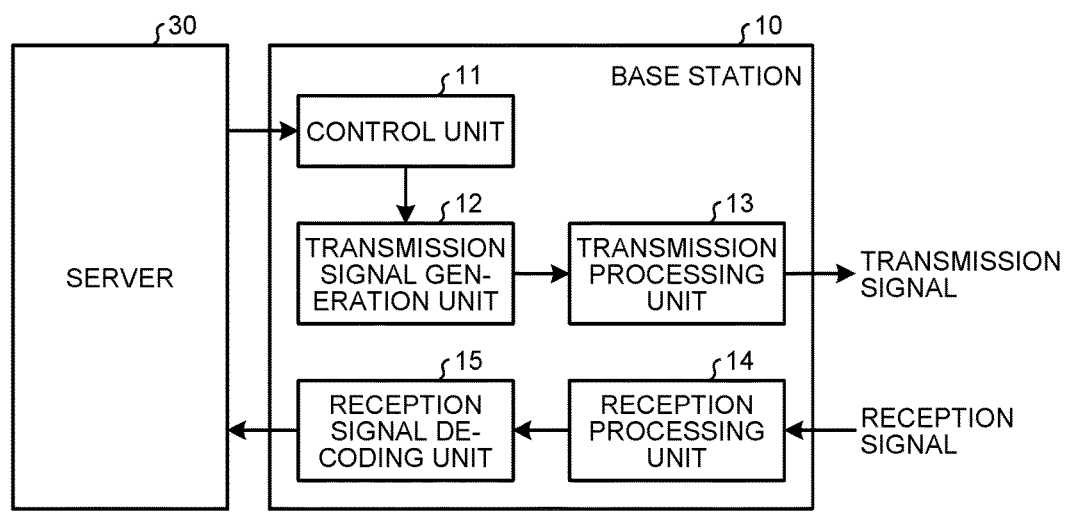
FIG. 4 is a diagram illustrating a functional configuration of the base station illustrated in FIG. 2.

FIG. 4 is a diagram illustrating a functional configuration of the base station 10 illustrated in FIG. 2. The base station 10 includes a control unit 11, a transmission signal generation unit 12, a transmission processing unit 13, a reception processing unit 14, and a reception signal decoding unit 15.

In response to an instruction from the server 30, the control unit 11 instructs the transmission signal generation unit 12 to generate a downlink signal to be transmitted to the terminal 20. Examples of the downlink signal include a control signal, a reference signal, and a data signal. Upon reception of the instruction from the control unit 11, the transmission signal generation unit 12 generates a signal, and outputs the signal generated, to the transmission processing unit 13.

The transmission processing unit 13 converts, into an analog signal, the transmission signal, which is a digital signal, generated by the transmission signal generation unit 12, and performs a filtering operation on the analog signal thus to generate a transmission signal. The transmission processing unit 13 transmits the transmission signal generated, to the terminal 20. The transmission processing unit 13 is communicable with each of the multiple terminals 20-1, 20-2, and 20-3 through switching between beam directions in a time division manner.

The control unit 11 determines multiple beam directions for use by the transmission processing unit 13 to communicate with the multiple respective terminals 20-1, 20-2, and 20-3. The control unit 11 causes the multiple terminals 20-1, 20-2, and 20-3 to share beam information representing how beams are used by the multiple terminals 20-1, 20-2, and 20-3, with which the transmission processing unit 13 is communicable. Specifically, the beam information includes information that identifies multiple beam directions determined by the control unit 11, and information that identifies multiple emission timings of beam emission from the transmission processing unit 13 to the multiple respective terminals 20-1, 20-2, and 20-3.

In issuing an instruction on generation of a reference signal, the control unit 11 is capable of giving an instruction about the time-frequency mapping of the reference signal. Examples of the reference signal include a channel state information reference signal (CSI-RS), a demodulation reference signal (DMRS), a tracking reference signal (TRS), and a phase tracking reference signal (PTRS), standardized by 3GPP and/or the like.

The reception processing unit 14 receives a signal from the terminal 20, and performs reception processing including conversion from the reception signal, which is an analog signal, into a digital signal, and a filtering operation. The reception processing unit 14 outputs the reception signal that has undergone the reception processing to the reception signal decoding unit 15. The reception signal is an uplink signal transmitted from the terminal 20. Examples of the reception signal include a data signal, a reference signal, and a control signal. An example of the uplink control signal is a physical uplink control channel (PUCCH). An example of the uplink data signal is a physical uplink shared channel (PUSCH). Examples of the uplink reference signal include a sounding reference signal (SRS), a DMRS, and a PTRS. The reception signal decoding unit 15 decodes the reception signal, and outputs the result of decoding to the server 30.

The control unit 11 transmits, for example, a CSI-RS, which is a reference signal, while switching between beam directions. In this operation, the CSI-RS includes an identification number, which is a beam number that identifies the beam direction. Transmission of multiple CSI-RSs by the control unit 11 while switching between beam directions causes the multiple CSI-RSs to include respective identification numbers different from one another. The terminal 20 measures power of each of the multiple CSI-RSs transmitted from the base station 10 in different directions, and notifies the base station 10 of the identification number included in the CSI-RS having the highest received power and the highest received power among the received powers measured.

The control unit 11 determines the beam direction to be used in communication with the terminal 20 that has provided notification of the received power, based on the received power notification of which is provided from the terminal 20. The control unit 11 notifies the terminal 20 of beam information including information that identifies the beam direction determined and information that identifies the beam emission timing. The information that identifies the beam direction is, for example, a beam number, i.e., the identification number that has been set in the CSI-RS. The terminal 20 stores in advance information that represents a correspondence relationship between a beam number and a beam direction. The information that identifies the beam emission timing is, for example, the interval between emissions of a beam emitted by the transmission processing unit 13. For example, in the example illustrated in FIG. 3, the beam information includes beam numbers of "1, 2, and 3" and offset values of "T and 2T" of emission timing when the interval between emission timings is T, beam direction #1 corresponds to a beam number of "1", beam direction #2 corresponds to a beam number of "2", and beam direction #3 corresponds to a beam number of "3".

Note that although the above example has been described in which the terminal 20 notifies the base station 10 of the highest received power and the identification number included in the CSI-RS having the highest received power, the present embodiment is not limited to such an example. For example, the terminal 20 may notify the base station 10 of the received power corresponding to each of the identification numbers. In this case, the base station 10 determines to use the beam direction corresponding to the identification number corresponding to the highest received power among the multiple received powers notification of which is provided, as the beam direction to be used in communication with the terminal 20 that has provided notification of the received power.

When notification of beam information is to be provided, the control unit 11 may either multicast or unicast the beam information. Use of a multicast scheme can reduce the task of transmitting the beam information individually to the multiple terminals 20, and can thus improve frequency use efficiency. In notification of beam information, the transmission processing unit 13 can use a frequency band around 6 GHz or 6 GHz or lower called frequency range 1 (FR1) in 3GPP. In notification of beam information, a beam can be used that is wider than the beam used to transmit a data signal to a terminal 20.

When notification of beam information is to be provided to multiple terminals 20, the base station 10 can emit a beam toward the cell including therein the multiple terminals 20. The beam information may be transmitted periodically or simultaneously with when the base station 10 transmits data to a terminal 20. In addition, when a beam direction is switched from one to another, a beam for use to transmit control information may be included in a beam to be switched.

The terminal 20 notified of the beam information can know how beams are used by the other terminals 20 located in the coverage area of the base station 10, specifically, the beam direction and the emission timing to be used by each of the other terminals 20. This enables the terminal 20 to take measures to cancel or avoid interference based on the beam direction and/or the emission timings used by the other terminals 20. For example, in a case in which the terminal 20 is a mobile terminal, interference can be avoided by movement of the user of the terminal 20 in a direction that allows interference to be avoided, based on multiple beam directions used by the base station 10. In addition, a terminal 20 that may be subject to interference desirably takes measures to improve the reception error rate. For example, a terminal 20 that may be subject to interference can send a request to the base station 10 to use a multiplex transmission scheme such as multi-user multiple-input and multiple-output (MU-MIMO).

Figure 5:
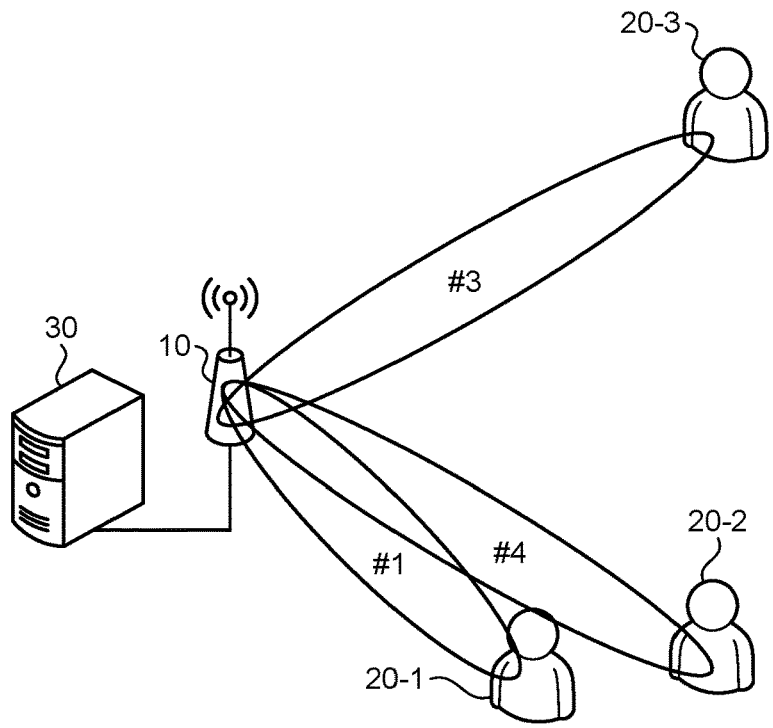
FIG. 5 is a diagram illustrating a situation in which a terminal has moved in the wireless communication system illustrated in FIG. 2.
Figure 6:
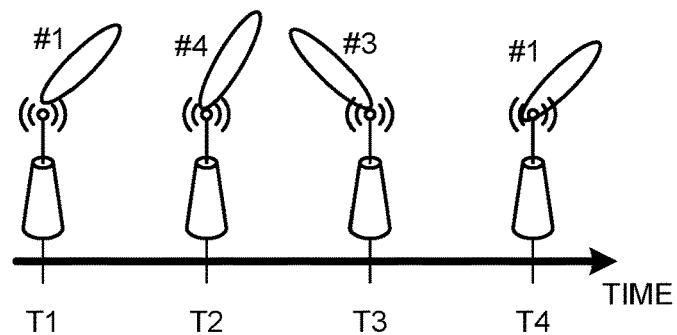
FIG. 6 is a diagram illustrating emission timings of the base station illustrated in FIG. 5.

FIG. 5 is a diagram illustrating a situation in which the terminal 20-2 has moved in the wireless communication system 100 illustrated in FIG. 2. The base station 10 repeatedly transmits a reference signal, in response to which the terminal 20 provides notification of received power to the base station 10, and the base station 10 then provides notification of beam information in response to the notification of the received power. Thus, even when the terminal 20 moves, the beam direction to be used is updated, thereby enabling the base station 10 and the terminal 20 to continue communication. For example, when the terminal 20-2 has moved, the beam direction to be used in communication between the base station 10 and the terminal 20 is updated from beam direction #2 illustrated in FIG. 2 to beam direction #4 illustrated in FIG. 5. FIG. 6 is a diagram illustrating emission timings of the base station 10 illustrated in FIG. 5. At time T1, the base station 10 directs the beam to beam direction #1 toward the terminal 20-1. At time T2, the base station 10 directs the beam to beam direction #4 toward the terminal 20-2. At time T3, the base station 10 directs the beam to beam direction #3 toward the terminal 20-3. Also at time T4 and thereafter, the beam directions are switched repeatedly in a similar manner.

In the situation illustrated in FIG. 5, the terminal 20-1 and the terminal 20-2 are located close to each other, which may cause interfere between the beam directed in beam direction #1 and the beam directed in beam direction #4. For example, when the terminal 20-1 having completed reception processing performs uplink communication with the base station 10, the beam directed from the base station 10 to the terminal 20-2 may leak into the beam from the terminal 20-1 thus to cause interference. Otherwise, when two of the terminals 20 are close to each other, one of the terminals 20 may interrupt the transmission channel between the base station 10 and the other one of the terminals 20 that is receiving data. This may reduce the received power of the terminal 20 that is receiving data. Accordingly, at least one of the terminals 20-1 and 20-2 desirably takes measures as described above to avoid interference or to improve the reception error rate, based on the beam information.

Note that although FIG. 5 illustrates the terminal 20-2 as being located in the coverage area of the base station 10 even after the movement, the terminal 20-2 may move out of the coverage area of the base station 10, in which case the base station 10 can no longer communicate with the terminal 20-2. When the base station 10 can no longer communicate with the terminal 20-2, the base station 10 may continue to emit the beam of beam direction #4 that is no longer used for communication, or may provide control to emit no beam at times T2 and T5, i.e., the emission timings used in communication with the terminal 20-2. Operation of inhibition of emitting a beam at times T2 and T5 is also referred to as muting operation.

Note that the beam information may include transmitted power used by the base station 10 to emit a beam in each of multiple beam directions. The control unit 11 can determine the transmitted power based on the maximum value of the received power notification of which is provided from the terminal 20.

Notification of the power transmitted from the base station 10 to each of the terminals 20-1, 20-2, and 20-3 enables each of the terminals 20-1, 20-2, and 20-3 to know relative positional relationships therebetween. Each of the terminals 20-1, 20-2, and 20-3 can calculate the distances between the base station 10 and each of the terminals 20-1, 20-2, and 20-3 based on the transmitted power notification of which is provided. Specifically, the terminal 20-1 can calculate the distance between the terminal 20-1 and the base station 10 based on the difference between the transmitted power notification of which is provided and the received power measured. The terminal 20-1 can calculate the distance between each of the terminals 20-2 and 20-3 and the base station 10 based on the calculated distance and on the transmitted power for the other terminals 20-2 and 20-3. In addition, the terminal 20-1 can know the relative positions of the respective terminals 20-2 and 20-3 based on the beam directions corresponding to the beam numbers notification of which is provided and on the distances calculated. Similarly, the terminal 20-2 can also know the relative positions of the respective terminals 20-1 and 20-3; and similarly, the terminal 20-3 can also know the relative positions of the respective terminals 20-1 and 20-2.

Note that knowing the relative positions enables the terminal 20 to move while keeping some distances from the other terminals 20, and to move not to interrupt beam emission. In a case in which the terminal 20 is a vehicle operating in an autonomous driving mode, the terminal 20 can determine a travel route of the vehicle based on the relative positions.

Figure 7:
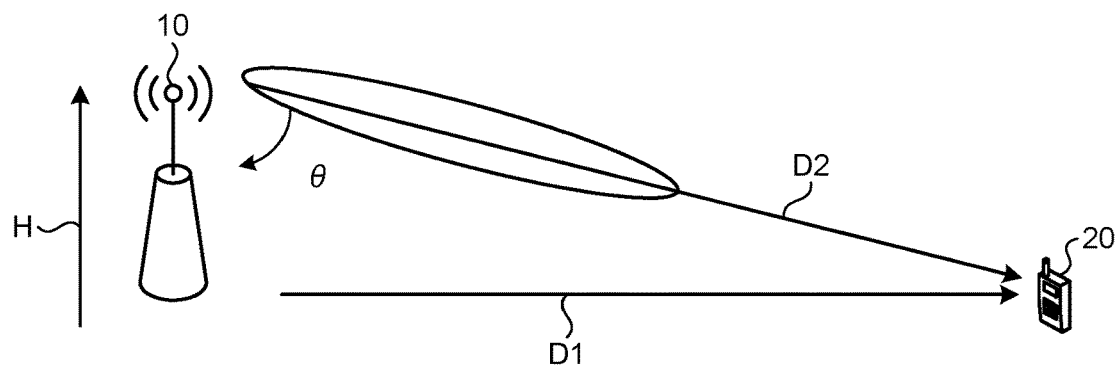
FIG. 7 is a diagram for describing an example of method for calculating the distance between the base station and a terminal.

FIG. 7 is a diagram for describing an example of method for calculating a distance D1 between the base station 10 and the terminal 20. The distance D1 between the base station 10 and the terminal 20 can be calculated based on a height H of the base station 10, on an angle θ of the beam directed from the base station 10 to the terminal 20, on the transmitted power of the base station 10, and on the received power of the terminal 20. The angle θ can be calculated by calculating a linear distance D2 between the top of the antenna of the base station 10 and the terminal 20 based on the difference between the transmitted power and the received power, and then using the distance D2 and the height H. The distance D1 is calculated using a trigonometric function.

Figure 8:
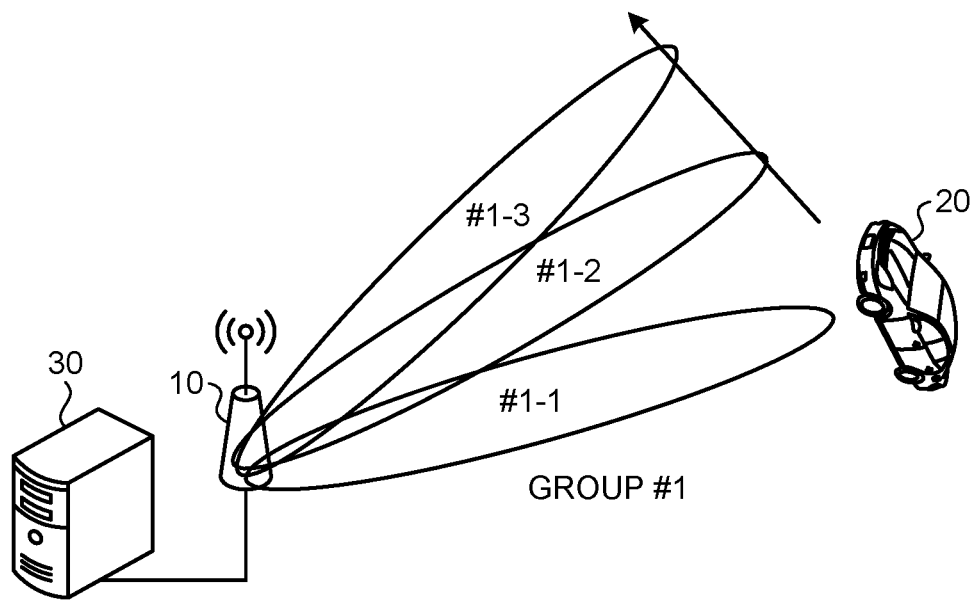
FIG. 8 is a diagram illustrating an example in which a terminal communicable with the base station illustrated in FIG. 4 is on board a mobile object.

FIG. 8 is a diagram illustrating an example in which the terminal 20 communicable with the base station 10 illustrated in FIG. 4 is on board a mobile object. In a case in which the terminal 20 is on board a mobile object, the transmission processing unit 13 of the base station 10 sequentially switches the beam direction for use in communication with the terminal 20 on board the mobile object according to the direction of movement of the terminal 20, and the control unit 11 generates beam information including beam group #1 including multiple beam directions of beam direction #1-1, beam direction #1-2, and beam direction #1-3 used by the transmission processing unit 13 to communicate with the terminal 20 on board the mobile object; and including timings when the transmission processing unit 13 switches the beam direction to align with the direction toward the terminal 20 on board the mobile object. When there are multiple terminals 20 that are communicable with the base station 10, the beam information generated is shared by the multiple terminals 20.

Note that although FIG. 8 illustrates an automobile as an example of mobile object, the mobile object may be one whose traveling direction and traveling section are known in advance, such as a train. The terminal 20 on board the mobile object sequentially switches the reception beam according to the multiple beam directions notification of which is provided beforehand, and can thus reduce or prevent a reduction in the received power even during movement. In addition, the base station 10 can switch between multiple beam directions to align with the direction toward the terminal 20 on board the mobile object according to the moving speed of the mobile object.

Moreover, in a case in which the mobile object is transporting multiple terminals 20, such as, for example, a case of a bus with multiple users onboard who each have the terminal 20, the multiple terminals 20 move together in the same direction. In this case, the beam directions toward the multiple terminals 20 transported by the same mobile object are the same, thereby allowing the base station 10 to update the beam directions at one time for the entire group of the multiple terminals 20. Consolidation of beam information for the entire group allows reduction in the overhead that is required as control information. This can be done by assigning a group identifier to the identifier of each of the multiple terminals 20, and updating the beam direction associated with the group identifier. In addition, the terminals 20 belonging to the group may share the beam information.

Figure 9:
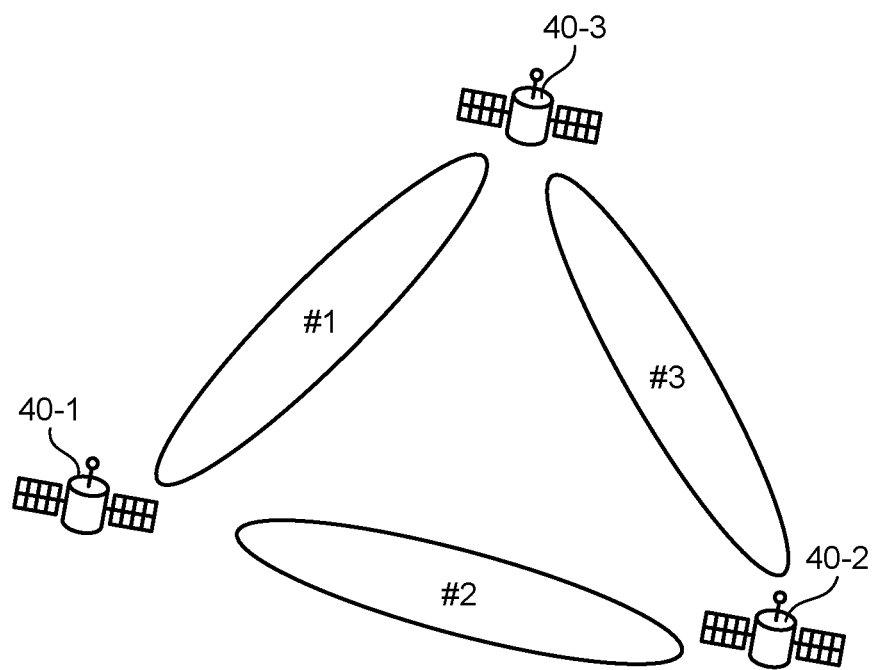
FIG. 9 is a diagram illustrating an example of system having a backhaul line established.

The foregoing description has been described primarily with respect to an example in which the wireless communication device 1 is the base station 10, and the communication peer devices 2 are the terminals 20. However, the wireless communication device 1 and the communication peer devices 2 may each be a HAPS 40 such as, for example, a satellite. FIG. 9 is a diagram illustrating an example of system having a backhaul line established. HAPSs 40-1, 40-2, and 40-3 illustrated in FIG. 9 establish a backhaul line. When no distinction needs to be made, the HAPSs 40-1, 40-2, and 40-3 are each hereinafter referred to simply as HAPS 40.

When a wireless backhaul link is established between multiple HAPSs 40, periodic switching of beams enables a large amount of data to be transmitted. In FIG. 9, a backhaul line is established from the HAPS 40-1 to either the HAPS 40-2 or the HAPS 40-3, and is switched every certain time. In FIG. 9, the HAPS 40-1 is an example of the wireless communication device 1, and the HAPSs 40-2 and 40-3 are each an example of the communication peer device 2. Sharing the beam information by the HAPSs 40-1, 40-2, and 40-3 can reduce interference between backhaul links, and can thus establish a stable backhaul link.

Figure 10:
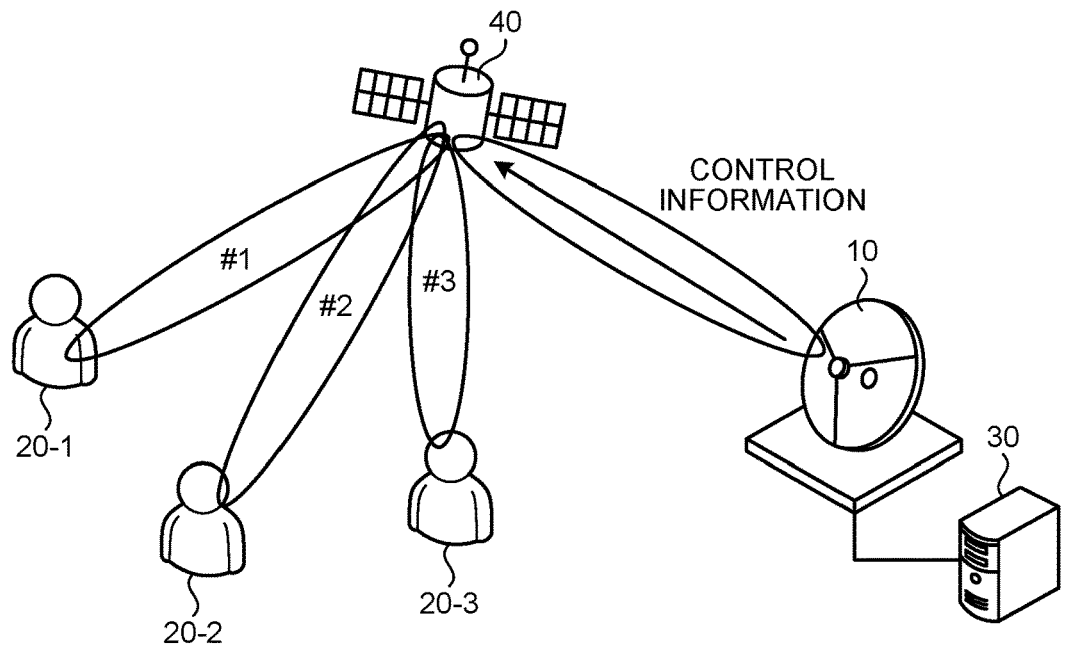
FIG. 10 is a diagram illustrating an example of system in which the wireless communication device is a HAPS.

Alternatively, the wireless communication device 1 may be the HAPS 40, and the communication peer devices 2 may be multiple ground-based base stations 10. Still alternatively, the wireless communication device 1 may be the HAPS 40, and the communication peer devices 2 may be multiple terrestrially-located terminals 20. FIG. 10 is a diagram illustrating an example of system in which the wireless communication device 1 is the HAPS 40. The HAPS 40 illustrated in FIG. 10 is an example of the wireless communication device 1, and is communicable with each of the multiple terminals 20-1, 20-2, and 20-3 through switching between the beam directions in a time division manner. In this case, the functionality of the server 30 and of the control unit 11 illustrated in FIG. 4 may be performed by a ground-based base station 10 or server 30. The base station 10 transmits control information, data, and the like to the HAPS 40 that is the wireless communication device 1, and the HAPS 40 in turn emits a beam to each of the terrestrially-located terminals 20-1, 20-2, and 20-3.

When one of the communication peer devices 2 moves, it is desirable that the wireless communication device 1 periodically perform beam sweeping to update beam information, and allow the multiple communication peer devices 2 to share the updated beam information. Otherwise, when one or more communication peer devices 2 are staying still, and one or more communication peer devices 2 are moving, the wireless communication device 1 may inform only the communication peer device(s) 2 in motion of the updated beam information, and not inform the communication peer device(s) 2 staying still of the beam information. Such dynamic notification of beam information that represents the updated beam direction enables a reduction in the received power of the communication peer devices 2 to be reduced or prevented.

An example of beam information updating performed between the base station 10 and the terminal 20 will now be described. The beam direction to be used in transmitting a data signal or a control signal is the beam direction that has been used for transmitting a CSI-RS, a DMRS, or the like. In this case, a beam number representing the beam direction is transmitted to the terminal 20. For example, regarding the beam information for data transmission, beam number X is notified to the terminal 20, where X is the beam number that has been used for transmitting a CSI-RS. When the beam direction for data transmission is to be switched, the base station 10 can switch the beam direction by changing the beam direction of the CSI-RS that is referred to. For example, assuming that X and Y represent different numbers, the base station 10 notifies the terminal 20 that the beam number to be referred to is changed from X to Y, or updates the beam number included in the beam information to notify the terminal 20 of the change. An example of information for managing the beam information is a transmission configuration indication (TCI) in 3GPP.

Figure 11:
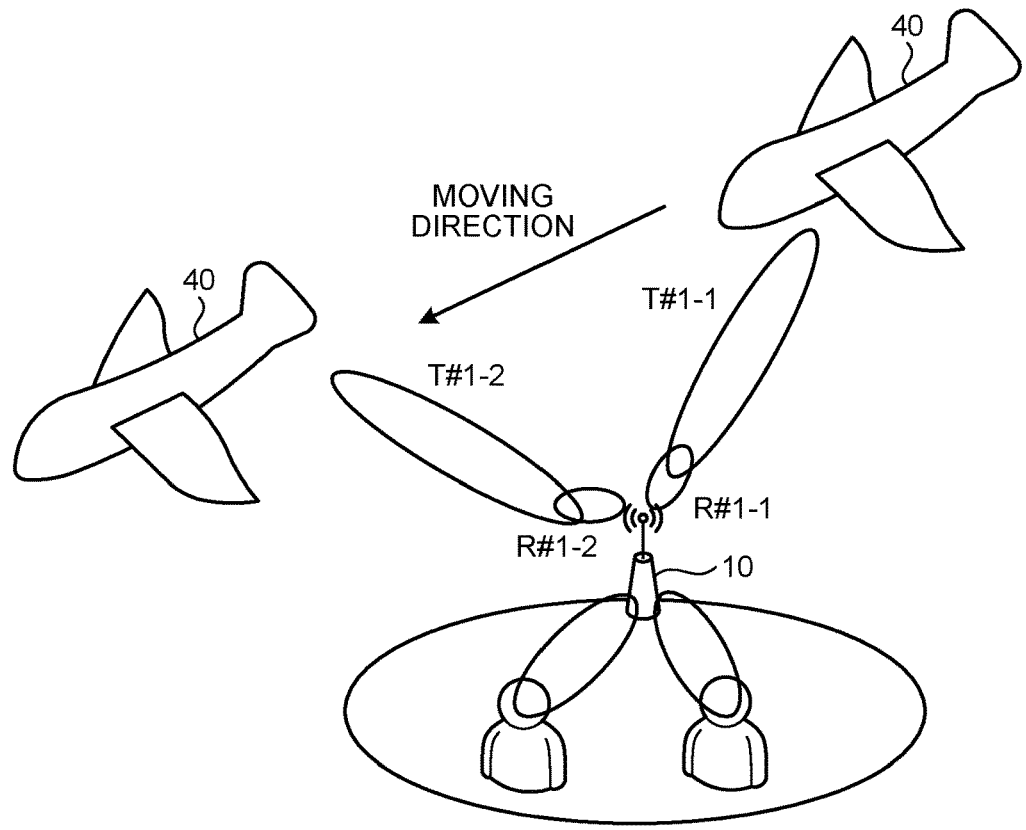
FIG. 11 is a diagram illustrating an example of system in which the wireless communication device moves.

FIG. 11 is a diagram illustrating an example of system in which the wireless communication device 1 moves. The HAPS 40 that is the airplane illustrated in FIG. 11 is an example of the wireless communication device 1, and the base station 10 is an example of the communication peer device 2. The HAPS 40 switches the direction of the transmission beam from transmission beam direction T #1-1 to transmission beam direction T #1-2 in response to the movement of the HAPS 40. In this operation, the base station 10 switches the direction of the reception beam from reception beam direction R #1-1 to reception beam direction R #1-2. Without switching of the directions of the transmission beam and of the reception beam, the received power might be reduced and the communication quality might in turn be reduced. Note that when the wireless communication device 1 moves a short distance, an operation may be performed in which the direction of the transmission beam is unchanged and the direction of the reception beam is switched. In addition, which beam is to be used after switching depends on the moving speed and on the direction of movement of the HAPS 40. Thus, the HAPS 40 may notify the base station 10 of the moving speed and the direction of movement of the HAPS 40.

Alternatively, the transmitting entity may determine candidates for multiple beam directions, and switch between the beam directions every certain time. In this case, notification of the candidates for multiple beam directions and the switching period are provided from the transmitting entity to the receiving entity. In the example illustrated in FIG. 11, the HAPS 40, which is the transmitting entity, notifies the base station 10, which is the receiving entity, of beam information indicating the candidates for multiple beam directions and the switching period. In this operation, the HAPS 40 may notify the base station 10 of the beam information directly, or can notify the base station 10 of the beam information via a higher layer, the server 30, or the like. In addition, the beam information desirably includes information representing that transmission beam directions T #1-1 and T #1-2 have the same Doppler shift. This enables the base station 10 that has received the beam information to know that the HAPS 40 is moving and the transmission beam direction will be switched after a certain time. A parameter for indicating that transmission beam directions have the same Doppler shift is only required to indicate that two beams are in a quasi-colocation (QCL) relationship.

In 3GPP, having a QCL relationship means having the same channel state. Examples of parameter for representing a statistical characteristic of a transmission channel include a Doppler shift, a Doppler broadening, an average delay, a delay spread, spatial information, and a spatial relationship. For example, a situation of two reference signals in a QCL state indicates that the two reference signals have passed through the same channel environment, which facilitates channel estimation. The relationship of QCL may be updated.

Figure 12:
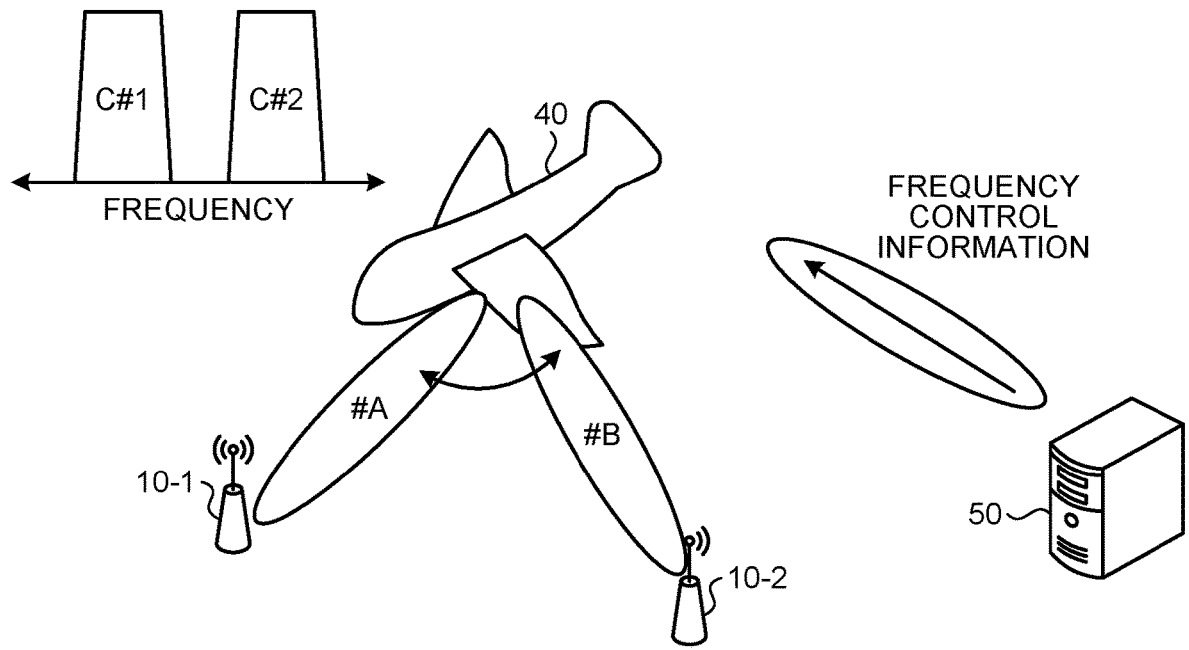
FIG. 12 is a diagram illustrating an example of system including a control station that controls frequency.

Note that the beam frequency for use in communication may be controlled. FIG. 12 is a diagram illustrating an example of system including a control station 50, which controls frequency. The HAPS 40 is communicable with each of the multiple base stations 10-1 and 10-2 through switching between beam directions in a time division manner. It is assumed here that the control station 50 notifies the HAPS 40 and the base stations 10-1 and 10-2 of beam information and of frequency control information, which represents the beam frequency to be used. In a case in which carriers C #1 and C #2 having different frequency bands are used, the control station 50 may provide notification, for example, that carrier C #1 is to be used when beam direction #A is used. The frequency to be used may be different for a different beam direction, or may be a frequency common to multiple beam directions. Examples of center frequency used in 3GPP include a carrier component (CC) and a bandwidth part (BWP). The control station 50 provides an instruction on the CC, the BWP, and the like to be used by the HAPS 40, in addition to beam directions #A and #B and the beam transmission time.

Note that the beam frequency to be used varies depending on the usage of adjacent frequencies, the interference state, and the like. It is necessary for determination of a suitable frequency band for use to know the usage of nearby frequencies and the interference state. It is thus desirable that observation values with respect to the interference state and the like be collectively stored in the control station 50 to allow the control station 50 to determine the frequency for use. The BWP may be adaptively switched for the purpose of randomization of interference between adjacent frequencies. In addition, in a case in which a beam is emitted to the multiple base stations 10-1 and 10-2, carrier C #1 may be used for the beam in beam direction #A toward the base station 10-1, and carrier C #2 may be used for the beam in beam direction #B toward the base station 10-2. Alternatively, only carrier C #1 may be used for either the base station 10-1 or the base station 10-2. Still alternatively, the carrier C #1 and carrier C #2 may be used while being switched therebetween according to time.

Note that also when a satellite emits a beam to a ground-based base station 10, beam information may be delivered to the base station 10. The term satellite in this context refers to a quasi-zenith satellite, a low-orbit satellite, and the like. The technology of the present embodiment is applicable also to a geosynchronous orbit satellite for a high-throughput satellite (HTS), a network formed of multiple low orbits, or the like. Examples of data delivered by a satellite system include information for broadcasting, control information, control information for communication, communication information, control information for device-to-device communication, information requested and delivered from the ground-based base station 10 or the terminal 20, control information for use in positioning, measurement information, and reference information.

Note that, in the embodiment heretofore described, sharing of a beam requires synchronization of emission timings of respective beams, thereby requiring synchronization using timing advance (TA) information or the like from each terminal. The foregoing description applies not only to a case in which a satellite functioning as the transmitting entity and a terrestrial station functioning as the receiving entity communicate with each other, but also to a case in which the receiving entity is the terminal 20, and to a case in which the transmitting entity is the base station 10. The following description will describe an example in which the transmitting entity is a satellite and the receiving entity is a terrestrial station. The time required for synchronization depends on the location, the moving speed, and the like of the satellite system or of the base station 10. That is, the time required for synchronization can desirably be set flexibly. The terrestrial station may send an acknowledge signal upon reception of a signal for synchronization purpose. The offset of emission timing can be obtained by obtaining the difference between the transmission time of a signal from the satellite and the reception time of a signal from the terrestrial station. Use of the offset of emission timing enables the downlink and uplink emission timings to be synchronized.

The signal for synchronization purpose may be, for example, a physical random access channel (PRACH) used in 3GPP. A RACH is periodically transmitted in 3GPP, and for satellite communication, multiple RACHs may be successively transmitted. The terrestrial station may send an acknowledge signal to the satellite after reception of the multiple RACHs or at each reception of a RACH. In a case in which multiple RACHs are to be stored for later operation, the terrestrial station needs a memory for storing reception signals. One advantage of the method of storing multiple RACHs for later operation is that the terminal 20 can perform operation in itself when the terminal 20 has transitioned to an IDLE or INACTIVE state. Another method may be that the terminal 20 stores therein a timing correction value, continues to store the correction value after the terminal 20 transitions to an IDLE or INACTIVE state, and uses the correction value stored in the terminal 20 when the terminal 20 returns to a communicable state. Meanwhile, the method of acknowledging each reception of a RACH is desirably used in a time sensitive application in terms of communication.

In addition, a process of transmitting a synchronization signal performed by the transmitting entity is called msg.1, and a process of response thereto by the receiving entity is called msg.2. In a case of communication with a satellite, msg.1 and msg.2 may be repeated multiple times to synchronize timings. In the case of such repetition, averaging of measurement values of the offset between the transmission time and the reception time enables timing correction accuracy to be improved. In addition to use of msg.1 and msg.2, information for timing adjustment purpose may be included in a system information broadcast (SIB) upon broadcasting an SIB. In addition, knowing the location of the satellite by the terrestrial station allows estimation of timing. If information about the satellite is included in control information, a signal for synchronization purpose, or the like, the terrestrial station can estimate timing. The foregoing operations may be used to provide correction information for use in timing correction operation using msg.1 and msg.2.

The number of RACHs to be successively transmitted may be selectable from different numbers of candidates. In addition, a RACH may be periodically transmitted at set intervals in units of seconds or minutes. A higher layer may show that the RACH is a RACH for use in satellite communication. The term higher layer here refers to information that is set by radio resource control (RRC), by a control station, or by a server. A RACH may be a signal different depending on the signal source, which may be a control station 50, a server 30, or a satellite. In addition, the identification number may differ depending on the receiving entity. In this case, a signal in a RACH can be generated using an identification number that is set on a per-signal source basis. Use of a different signal for synchronization for each signal source enables the receiving entity to be less subject to crosstalk, erroneous synchronization, interference in mutual synchronization signals, and the like. Improvement in reliability in reception of a signal for synchronization allows synchronization accuracy to be improved.

Note that in a case in which a satellite emits a beam to multiple base stations 10, the satellite and the multiple base stations 10 need synchronization. Sharing of beam information may be performed after synchronization is established, or a terrestrial station that has failed in timing adjustment within a predetermined time period may be removed from sharing beam information.

Second Embodiment

Figure 13:
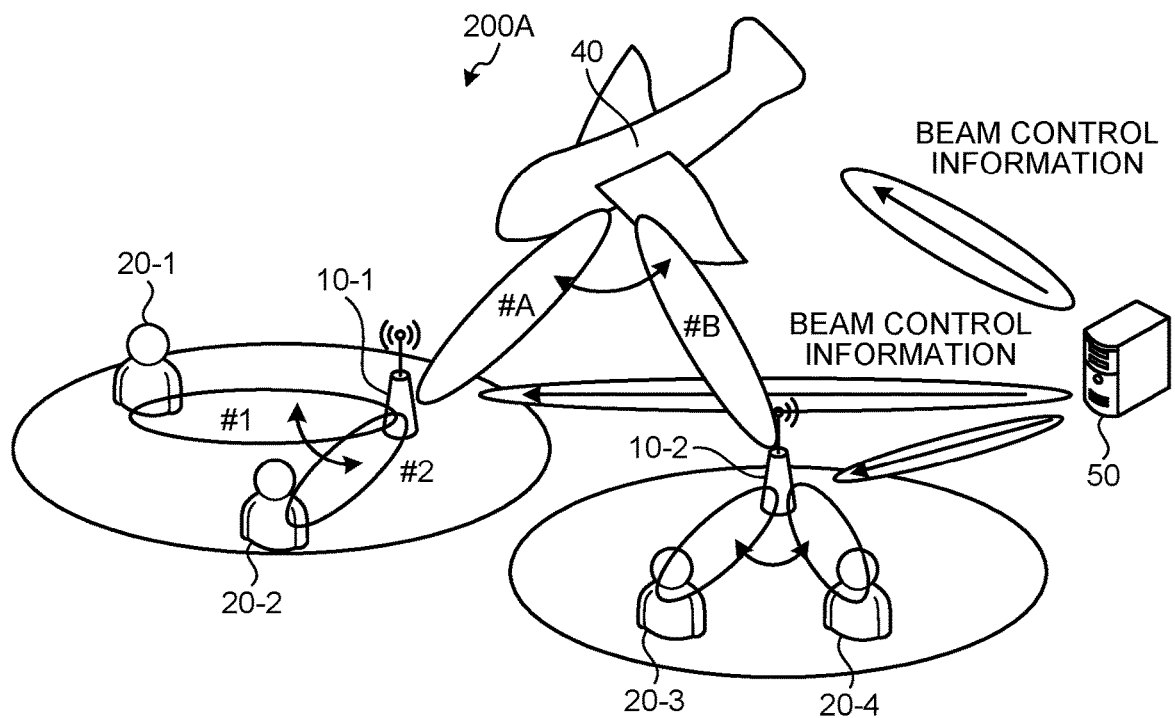
FIG. 13 is a diagram illustrating a configuration of a wireless communication system according to a second embodiment.

FIG. 13 is a diagram illustrating a configuration of a wireless communication system 200A according to a second embodiment. The wireless communication system 200A includes the multiple base stations 10-1 and 10-2, the terminals 20-1, 20-2, and 20-3, a terminal 20-4, the HAPS 40, and the control station 50.

The HAPS 40 is communicable with each of the multiple base stations 10-1 and 10-2 through switching between beam directions in a time division manner. The control station 50 notifies each of the HAPS 40 and the base stations 10-1 and 10-2 of beam information. The HAPS 40 and the base stations 10-1 and 10-2 each control the beam direction and the beam emission timing based on the beam information notification of which is provided from the control station 50. This operation is desirably performed such that the beams directed from the HAPS 40 to the respective base stations 10-1 and 10-2, and the beams directed from the base station 10-1 to the respective terminals 20-1 and 20-2 or the beams directed from the base station 10-2 to the respective terminals 20-3 and 20-4 are associated with one another to be managed in a hierarchical structure. Management of beams in a hierarchical structure enables a reduction in the overhead required to manage beam information. The beams directed from the HAPS 40 to the respective base stations 10-1 and 10-2 can each be referred to as parent beam. The beams directed from the base station 10-1 to the respective terminals 20-1 and 20-2, and the beams directed from the base station 10-2 to the respective terminals 20-3 and 20-4 can each be referred to as child beam. In addition, in the system configuration illustrated in FIG. 13, the terminals 20-1 and 20-2 can each be referred to as subordinate device to the base station 10-1, and the terminals 20-3 and 20-4 can each be referred to as subordinate device to the base station 10-2.

Figure 14:
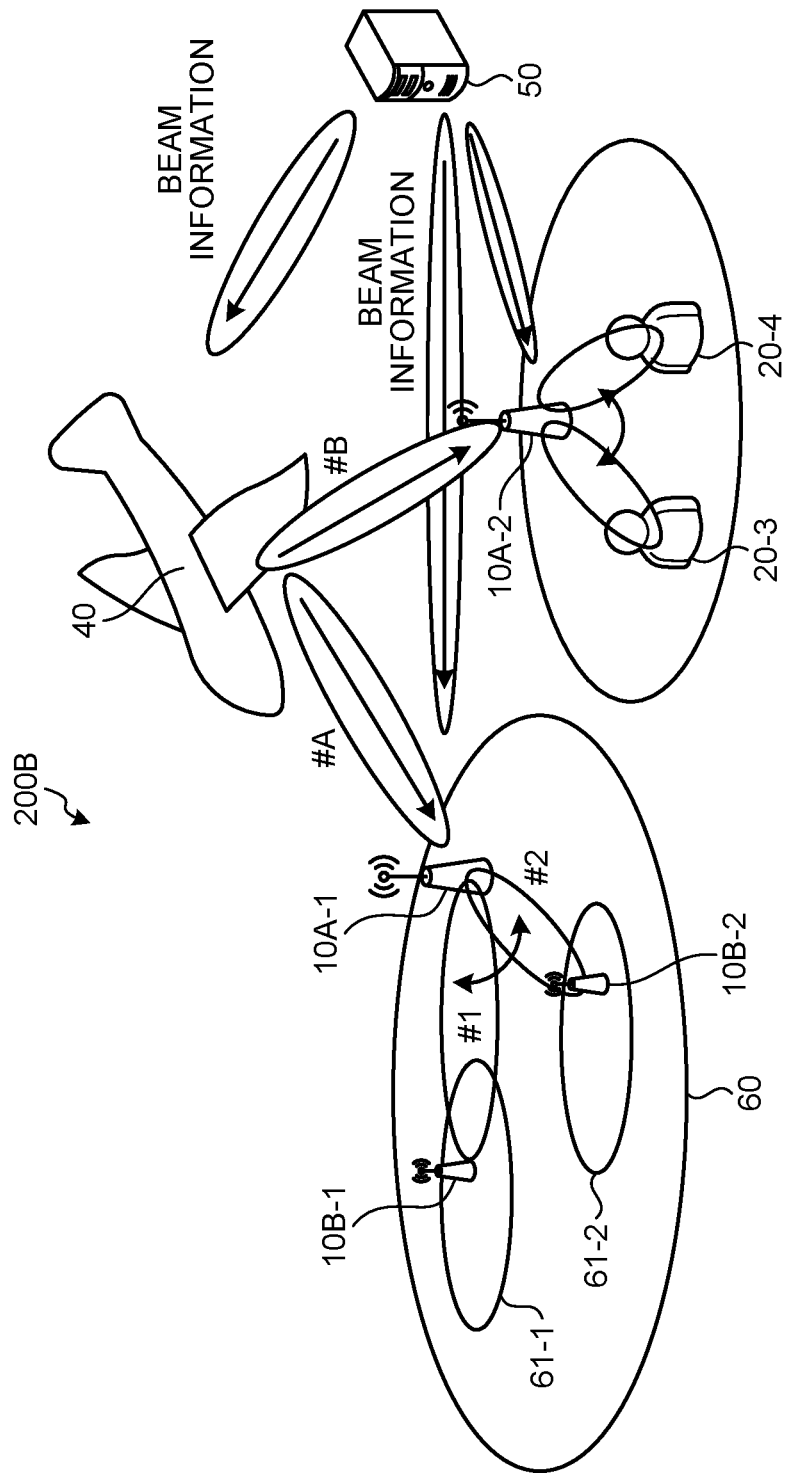
FIG. 14 is a diagram illustrating a configuration of another wireless communication system according to the second embodiment.

FIG. 14 is a diagram illustrating a configuration of a wireless communication system 200B according to the second embodiment. The wireless communication system 200B includes the HAPS 40, multiple base stations 10A-1 and 10A-2, which each serve a macrocell, multiple base stations 10B-1 and 10B-2, which each serve a microcell, the terminals 20-3 and 20-4, and the control station 50. The base station 10A-1 serves a macrocell 60, the base station 10B-1 serves a microcell 61-1, and the base station 10B-2 serves a microcell 61-2.

The HAPS 40 is communicable with each of the multiple base stations 10A-1 and 10A-2 through switching between beam directions in a time division manner. The control station 50 notifies each of the HAPS 40 and the base stations 10A-1, 10A-2, 10B-1, and 10B-2 of beam information. The HAPS 40 and the base stations 10A-1, 10A-2, 10B-1, and 10B-2 each control the beam direction and the beam emission timing based on the beam information notification of which is provided from the control station 50. This operation is desirably performed such that the beams directed from the HAPS 40 to the respective base stations 10A-1 and 10A-2, and the beams directed from the base station 10A-1 to the respective base stations 10B-1 and 10B-2 or the beams directed from the base station 10A-2 to the respective terminals 20-3 and 20-4 are associated with one another to be managed in a hierarchical structure. Management of beams in a hierarchical structure enables a reduction in the overhead required to manage beam information. The beams directed from the HAPS 40 to the respective base stations 10A-1 and 10A-2 can each be referred to as parent beam. The beams directed from the base station 10A-1 to the respective base stations 10B-1 and 10B-2, and the beams directed from the base station 10A-2 to the respective terminals 20-3 and 20-4 can each be referred to as child beam. Note that, in the system configuration illustrated in FIG. 14, the base stations 10B-1 and 10B-2 can each be referred to as subordinate device to the base station 10A-1, and the terminals 20-3 and 20-4 can each be referred to as subordinate device to the base station 10A-2.

Management of beams in a hierarchical structure enables a beam setting to be successively used depending on the usage of the beams. For example, when a beam in beam direction #A is used for backhaul, beams in the respective beam directions #1 and #2 associated with beam direction #A can also be used for backhaul. Reliability and quality of service (QoS) required for backhaul can thus be succeeded. When a significant amount of data is periodically transmitted from the HAPS 40 to the terminal 20, use of a backhaul line within a certain time period is advantageous. In such use, giving increased priority to reception processing on the backhaul line enables the terminal 20 to establish a backhaul line without reduction in reliability. For example, the beam in beam direction #B from the HAPS 40 to the base station 10A-2 of FIG. 14 can be used as a backhaul line. In this case, increased priority can be given to beam direction #B.

Note that when the control station 50 has transmitted control information to the HAPS 40, the HAPS 40 may demodulate the control information, and adaptively switch the beam direction for emitting a beam to the ground. The HAPS 40 may perform a scheduled operation to adaptively determine the beam direction based on the number of available beams, the available band, and the like. Use of scheduling by the HAPS 40 enables the beam direction to be suitably switched according to the performance of the HAPS 40. In addition, the control information may include information giving an instruction on switching of the beam direction from the HAPS 40. This enables a reduction of processing load of the HAPS 40 in adaptively switching the beam direction, and thus enables the circuit configuration of the HAPS 40 to be simplified.

Figure 15:
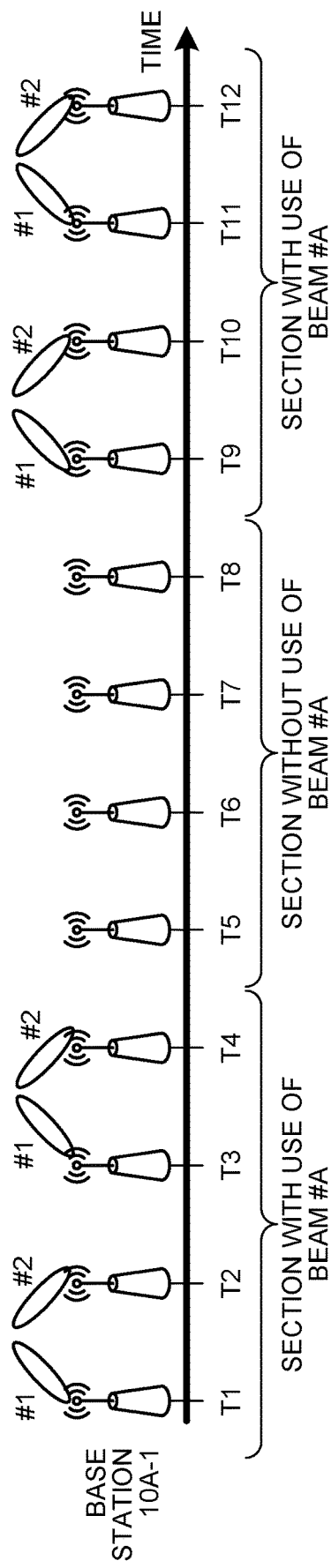
FIG. 15 is a diagram illustrating a first example of timings of beam emission of the base station illustrated in FIG. 14.

FIG. 15 is a diagram illustrating a first example of timings of beam emission of the base station 10A-1 illustrated in FIG. 14. FIG. 15 illustrates timings when the base station 10A-1 emits a beam in each of beam directions #1 and #2. During a time period from T1 to T4 and a time period from T9 to T12, in which the HAPS 40 emits a beam in beam direction #A to the base station 10A-1, the base station 10A-1 alternately emits a beam in beam directions #1 and #2. During a time period from T5 to T8, in which the HAPS 40 emits a beam in beam direction #B, no beam is emitted to the base station 10A-1, and the base station 10A-1 thus emits no beam in beam directions #1 and #2. In addition, during the time period from T1 to T4 and the time period from T9 to T12, in which the HAPS 40 emits a beam to the base station 10A-1, the base station 10A-1 may store the information received from the HAPS 40 in a memory, and transmit previously stored information to the base stations 10B-1 and 10B-2.

Figure 16:
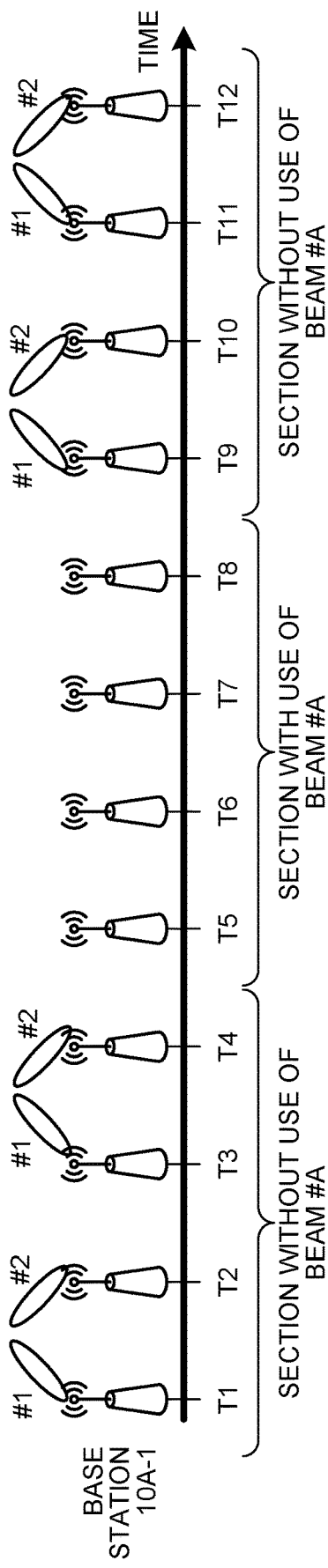
FIG. 16 is a diagram illustrating a second example of timings of beam emission of the base station illustrated in FIG. 14.

FIG. 16 is a diagram illustrating a second example of timings of beam emission of the base station 10A-1 illustrated in FIG. 14. FIG. 16 illustrates timings when the base station 10A-1 emits a beam in each of beam directions #1 and #2. During the time period from T1 to T4 and the time period from T9 to T12, in which the HAPS 40 emits a beam in beam direction #B, but emits no beam in beam direction #A, the base station 10A-1 alternately emits a beam in beam directions #1 and #2. During the time period from T5 to T8, in which the HAPS 40 emits a beam in beam direction #A, the base station 10A-1 emits no beam in beam directions #1 and #2. In this case, the base station 10A-1 cumulatively stores information received from the HAPS 40, and transmits the cumulatively stored information in beam directions #1 and #2 during the time period from T1 to T4 and the time period from T9 to T12.

Note that the time sections of periodic transmission in beam directions #1 and #2 may differ depending on when a beam is emitted in beam directions #A and #B. For example, in the first example illustrated in FIG. 15, the base station 10A-1 emits a beam in beam direction #1 at times T1, T3, T9, and T11, but emits no beam at times T5, T6, T7, and T8. This operation eliminates the need for the base stations 10B-1 and 10B-2 to direct the reception beam to the base station 10A-1 during the time period from T5 to T8, and thus enables power consumption to be reduced. To periodically emit a beam only in a specific time period and to schedule a time period with no beam emission as described above, bitwise masking processing is advantageous. Masking is a technique of indicating on a bit-by-bit basis whether to transmit a channel or reference signal during a time section defined in a standard. For example, a value "1" represents a time period for transmission, while a value "0" represents a time period for no transmission. As illustrated in the examples of FIGS. 15 and 16, assuming that the emission timings are at intervals of a constant time T, relationships of T2=T1+T, T3=T2+T, and T4=T3+T are satisfied. Assuming that one section in masking processing has a length of 4T in the example illustrated in FIG. 16, times "T1, T2, T3, T4" correspond to the first section, times "T5, T6, T7, and T8" correspond to the second section, and times "T9, T10, T11, and T12" correspond to the third section. Thus, the first section and the third section are emission sections, and the second section is a non-emission section, and the masking processing can therefore be expressed by "101".

Third Embodiment

Figure 17:
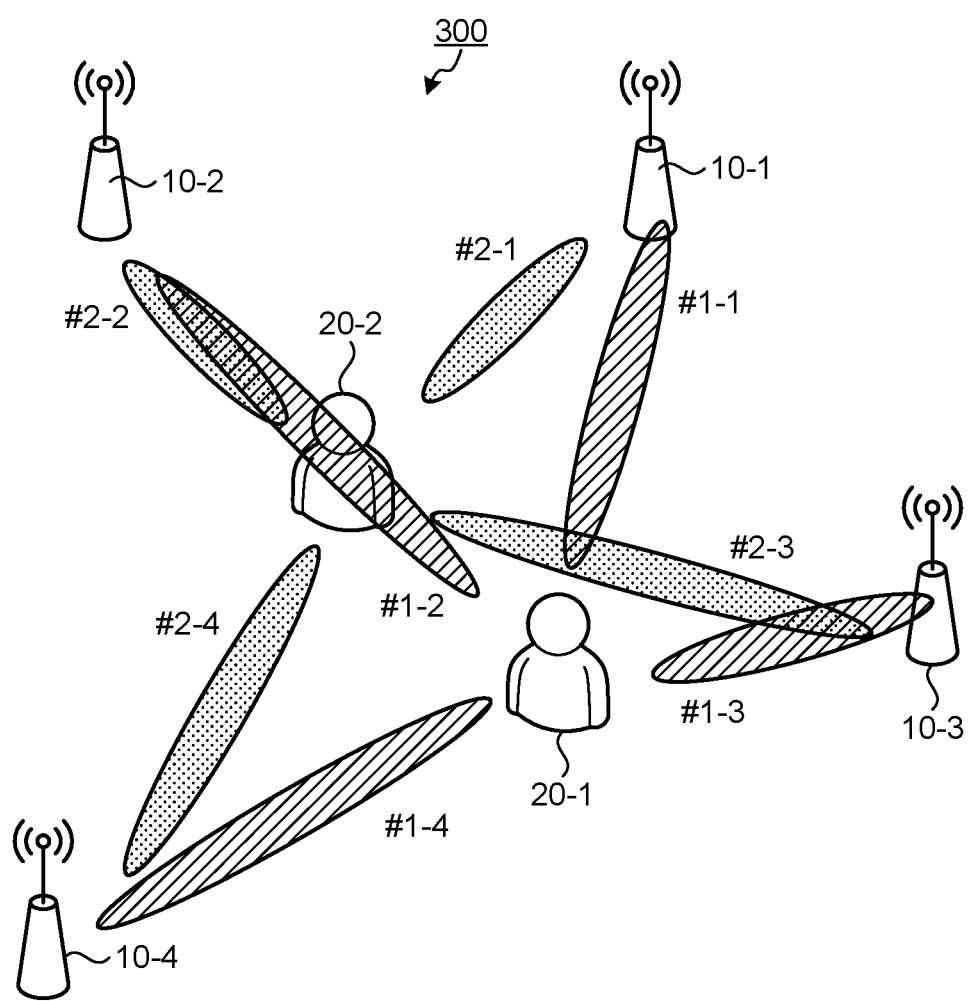
FIG. 17 is a diagram illustrating an example of a configuration of a wireless communication system according to a third embodiment.

FIG. 17 is a diagram illustrating an example of a configuration of a wireless communication system 300 according to a third embodiment. In the third embodiment, the terminals 20 are each an example of the wireless communication device 1, and the base stations 10 are each an example of the communication peer device 2. The wireless communication system 300 includes the base stations 10-1 and 10-2, base stations 10-3 and 10-4, and the terminals 20-1 and 20-2.

Each of the terminals 20-1 and 20-2 can perform uplink communication with each of the multiple base stations 10-1, 10-2, 10-3, and 10-4 through switching between beam directions in a time division manner. The multiple terminals 20 may transmit a data signal, a reference signal, and a control signal to multiple base stations 10. In this case, each of the terminals 20-1 and 20-2 does not simultaneously communicate with the multiple base stations 10-1, 10-2, 10-3, and 10-4, but communicates on a one-by-one basis through switching between beam directions. In a case in which the base stations 10 communicate with multiple terminals 20, the base stations 10 are, in many circumstances, located apart from each other enough to be unlikely to interfere with each other unless communication is established with the multiple terminals 20 at the same time. This almost eliminates the need to consider interference between the base stations 10, i.e., the wireless communication devices 1, which are transmitting entities. In contrast, when the wireless communication devices 1, which are transmitting entities, are the terminals 20, the terminals 20 are likely to be close to each other enough to cause interference. Accordingly, in the present embodiment, beam information is shared not only by the multiple base stations 10 but also by the multiple terminals 20. Sharing beam information by the multiple terminals 20-1 and 20-2 enables a reduction of interference in uplink communication with the other one of the terminals 20.

Figure 18:
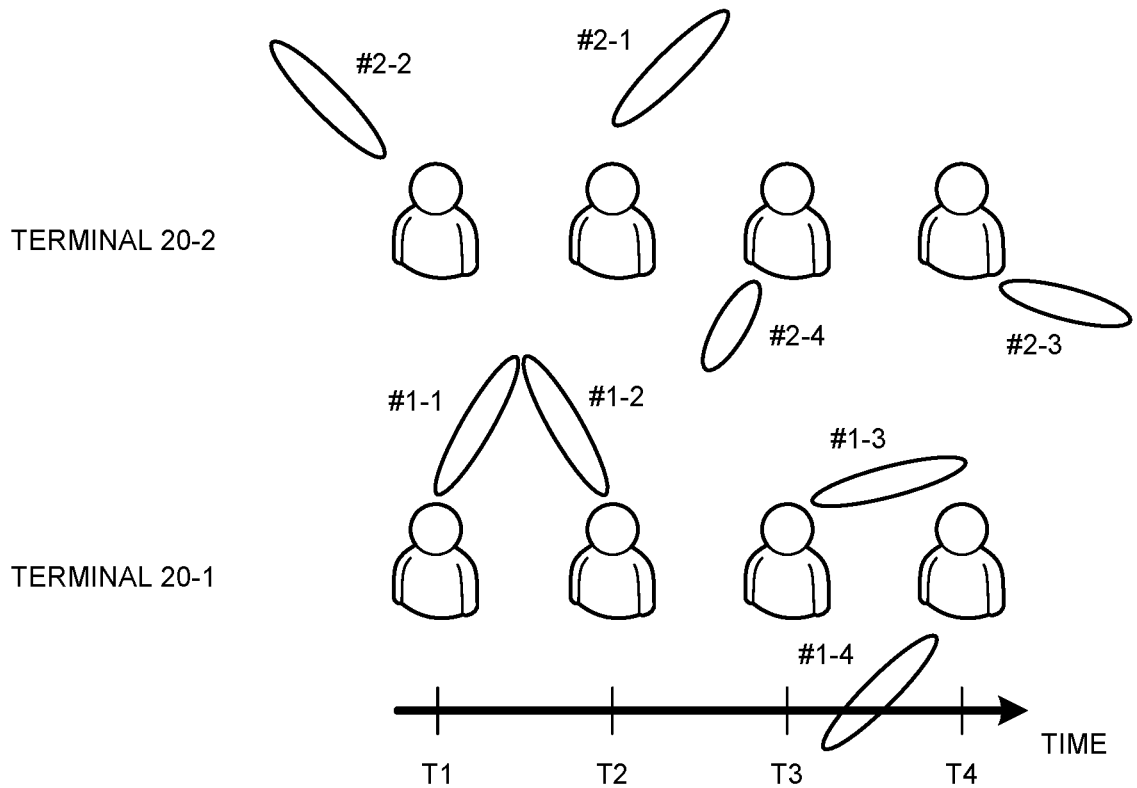
FIG. 18 is a diagram illustrating an example of temporal change in beam directions used by terminals illustrated in FIG. 17.

FIG. 18 is a diagram illustrating an example of temporal change in the beam directions used by the terminals 20-1 and 20-2 illustrated in FIG. 17. Sharing beam information by the terminals 20-1 and 20-2 enables control to be provided to prevent the terminals 20-1 and 20-2 from simultaneously using beam directions that will cause interference with each other. For example, in the example of FIG. 17, use of beam direction #2-3 by the terminal 20-2 when the terminal 20-1 is using beam direction #1-1 or use of beam direction #2-2 by the terminal 20-2 when the terminal 20-1 is using beam direction #1-2 may cause interference between beams. Thus, interference between beams is substantially preventable by performing an operation such that the terminal 20-1 uses beam direction #1-1 and the terminal 20-2 uses beam direction #2-2 at time T1, the terminal 20-1 uses beam direction #1-2 and the terminal 20-2 uses beam direction #2-1 at time T2, the terminal 20-1 uses beam direction #1-3 and the terminal 20-2 uses beam direction #2-4 at time T3, and the terminal 20-1 uses beam direction #1-4 and the terminal 20-2 uses beam direction #2-3 at time T4.

Figure 19:
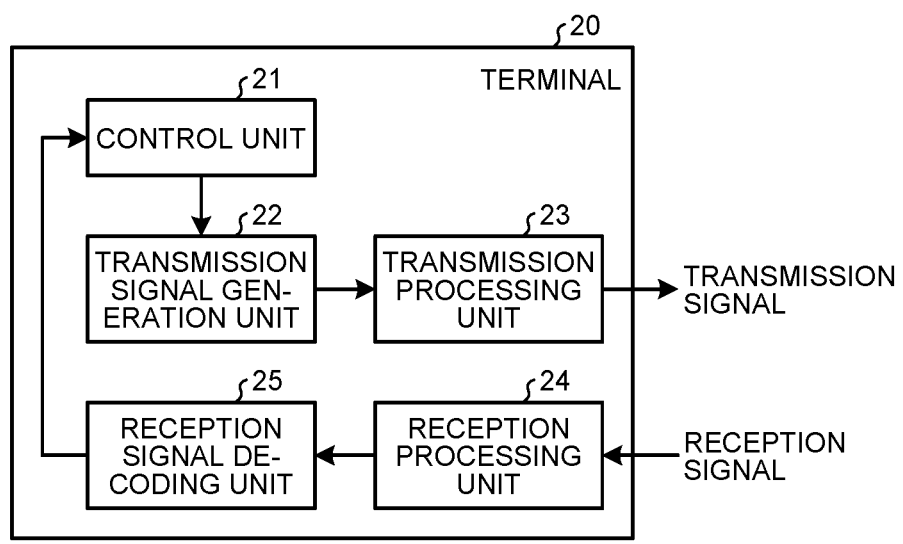
FIG. 19 is a diagram illustrating a functional configuration of the terminals illustrated in FIG. 17.

FIG. 19 is a diagram illustrating a functional configuration of the terminal 20 illustrated in FIG. 17. The terminal 20 includes a control unit 21, a transmission signal generation unit 22, a transmission processing unit 23, a reception processing unit 24, and a reception signal decoding unit 25. The control unit 21 of the terminal 20 instructs the transmission signal generation unit 22 to generate a transmission signal based on an instruction from the base station 10. The transmission signal generation unit 22 generates a transmission signal and then outputs the transmission signal generated, to the transmission processing unit 23. Examples of the transmission signal include a data signal and a reference signal from the terminal 20. The instruction from the base station 10 includes the beam number to be used by the terminal 20, and the like. The transmission processing unit 23 converts, into an analog signal, the transmission signal, which is a digital signal, generated by the transmission signal generation unit 22, and performs a filtering operation on the analog signal thus to generate a transmission signal. The transmission processing unit 23 transmits the transmission signal generated, to the base station 10. The transmission processing unit 23 is communicable with each of the multiple base stations 10-1, 10-2, 10-3, and 10-4 through switching between beam directions in a time division manner. Note that although not illustrated in FIG. 19, the terminal 20 may include a storage unit such as a memory. The storage unit is capable of storing a timing correction value and the like.

Note that although not illustrated in FIG. 17, the terminals 20-1 and 20-2 are communicable with the server 30 or with the control station 50. The beam directions to be used by the terminals 20-1 and 20-2 can be specified by the server 30 or by the control station 50. The beam directions to be used by the terminals 20-1 and 20-2 may alternatively be specified by the base station 10-1 or by the base station 10-2. The following description will describe an example in which the control station 50 specifies the beam directions.

Figure 20:
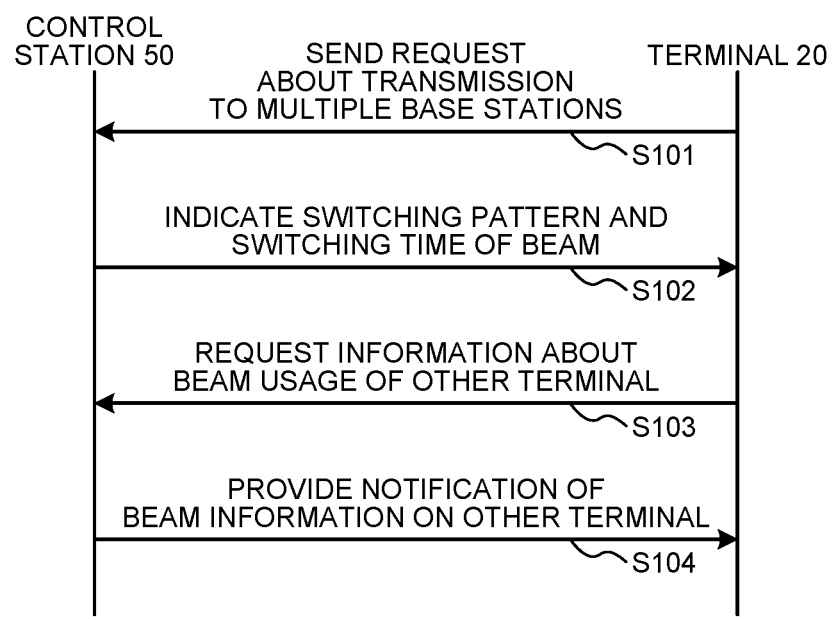
FIG. 20 is a sequence diagram illustrating a first example of operation of the wireless communication system illustrated in FIG. 17.

FIG. 20 is a sequence diagram illustrating a first example of operation of the wireless communication system 300 illustrated in FIG. 17. The terminal 20 sends, to the control station 50, a request about transmission to multiple base stations 10 that are potential communication peers (step S101). The control station 50 collectively holds, for multiple terminals 20, information about how beams are used by the multiple base stations 10 with which a terminal 20 is communicable. The control station 50 indicates, to the terminal 20, a beam switching pattern and a switching time to be used by the terminal 20, based on how beams are used in the wireless communication system 300 (step S102). For example, the control station 50 is capable of determining the timing of switching of the beam direction and a beam number after switching, and of notifying the terminal 20 of such information. A candidate for the beam direction after switching may be the beam number of an SRS or the beam number of a CSI-RS, an SSB, or the like. When a downlink beam number is used, the terminal 20 accordingly uses a transmission beam directed to the direction of the reception beam that has been used for receiving a downlink beam. When the beam number of an SRS is used, the terminal 20 directs the transmission beam to the direction corresponding to the beam number of the SRS.

The terminal 20 requests, from the control station 50, information about beam usage of other terminals 20 (step S103). In response to the request from the terminal 20, the control station 50 provides notification of beam information representing the beam usage of other terminals 20 (step S104). For example, when the terminal 20-1 illustrated in FIG. 17 requests information about beam usage from the control station 50, the control station 50 can notify the terminal 20-1 of beam information representing the beam usage of the terminal 20-2.

Figure 21:
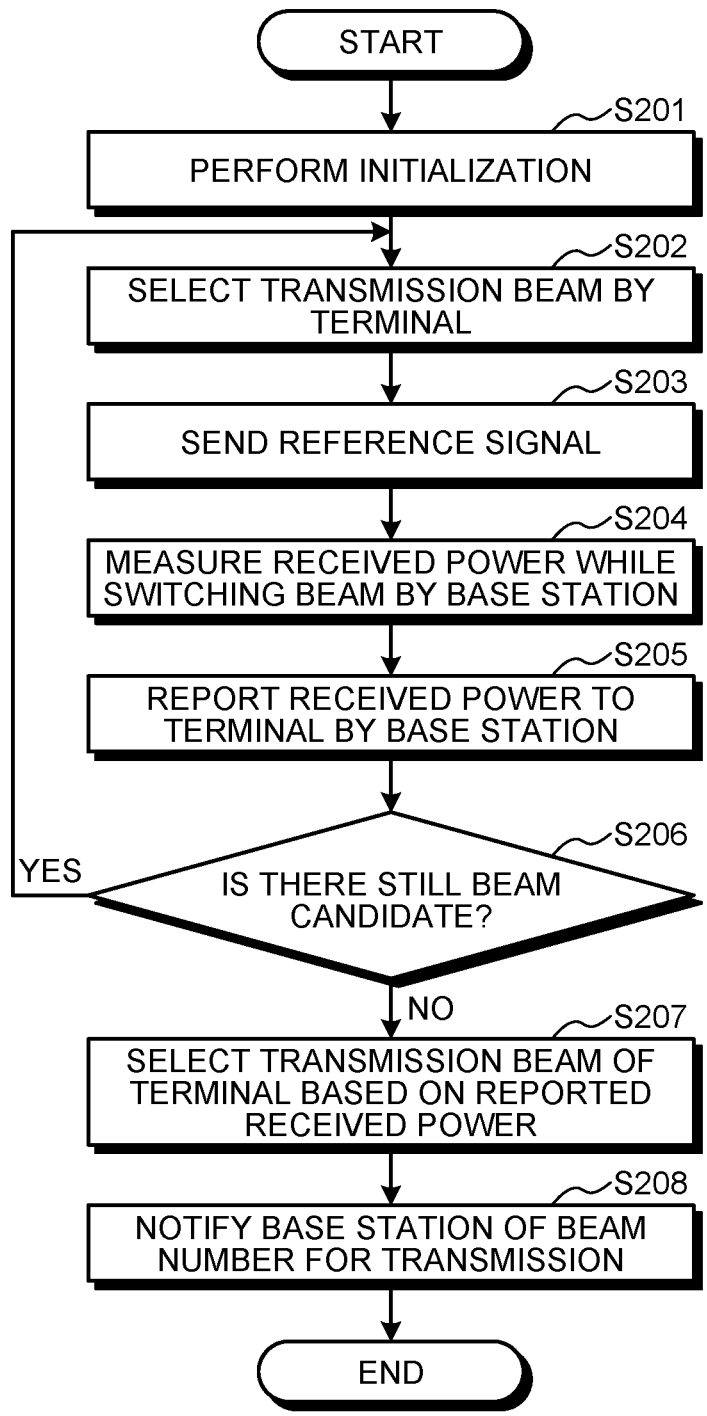
FIG. 21 is a flowchart for describing an example of operation performed between the base stations and the terminals illustrated in FIG. 17.

FIG. 21 is a flowchart for describing an example of operation performed between the base station 10 and the terminal 20 illustrated in FIG. 17. The terminal 20 can use an SRS for use in uplink sounding to inform the control station 50 of the beam direction toward the base station 10 that is the communication peer. The control station 50 can know the state of transmission channel between the terminal 20 and the base station 10 through a reference signal used for sounding.

First, the terminal 20 performs initialization (step S201). For example, the terminal 20 performs beam sweeping using different SRS signals. Specifically, the terminal 20 first selects a beam direction for use in transmission (step S202). The terminal 20 transmits a reference signal in the beam direction selected (step S203).

The base station 10 measures received power while switching between beam directions (step S204). The base station 10 reports the maximum received power to the terminal 20 (step S205). Upon reception of the report, the terminal 20 determines whether there is still a candidate for the beam for use in transmission (step S206). If there is still a candidate for the beam for use in transmission (step S206: Yes), the terminal 20 repeats the process from step S202.

If there is no more candidate for the beam for use in transmission (step S206: No), the terminal 20 selects a beam for use by the terminal 20 in transmission to the base station 10, based on the received power reported (step S207). The terminal 20 notifies the base station 10 of the beam number for transmission determined at step S207 (step S208).

Use of different time-frequency mappings and different symbol series for use in an SRS enables multiple different SRSs to be generated. The terminal 20 can use each of the multiple SRSs generated, as the candidate for the beam to be used by the terminal 20.

Note that before providing an instruction on uplink beam switching, the emission timings need to be synchronized in advance among the terminals 20. In this case, the emission timings of the respective terminals 20 may be synchronized using TA or the like. In addition, because the terminal 20 also switches beams toward multiple base stations 10, the emission timings need to be synchronized with the multiple base stations 10 using TA. After synchronization of the emission timings, the terminal 20 can perform beam sweeping of transmission and reception beams to select a suitable beam. Synchronization of emission timings with multiple base stations 10 enables the base station 10 to receive a beam without loss of received power.

Figure 22:
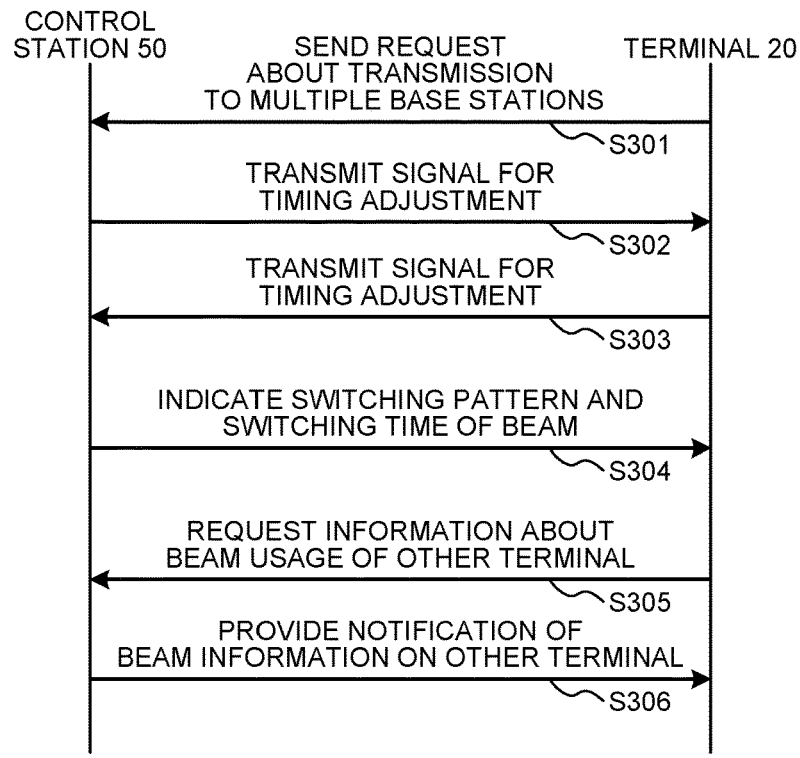
FIG. 22 is a sequence diagram illustrating a second example of operation of the wireless communication system illustrated in FIG. 17.

FIG. 22 is a sequence diagram illustrating a second example of operation of the wireless communication system 300 illustrated in FIG. 17. The sequence diagram illustrated in FIG. 22 further includes operation of synchronization of the emission timings in advance among the terminals 20 in addition to the operation illustrated in FIG. 20.

The terminal 20 sends, to the control station 50, a request about transmission to multiple base stations 10 that are potential communication peers (step S301). The control station 50 transmits a signal for timing adjustment purpose to the terminal 20 (step S302). In response to the signal for timing adjustment purpose transmitted from the control station 50, the terminal 20 transmits a signal for timing adjustment purpose to the control station 50 (step S303). The control station 50 collectively holds, for multiple terminals 20, information about how beams are used by the multiple base stations 10 with which a terminal 20 is communicable. The control station 50 indicates, to the terminal 20, a beam switching pattern and a switching time to be used by the terminal 20, based on how beams are used in the wireless communication system 300 (step S304).

The terminal 20 requests, from the control station 50, information about beam usage of other terminals 20 (step S305). In response to the request from the terminal 20, the control station 50 provides notification of beam information representing the beam usage of other terminals 20 (step S306). For example, when the terminal 20-1 illustrated in FIG. 17 requests information about beam usage from the control station 50, the control station 50 can notify the terminal 20-1 of beam information representing the beam usage of the terminal 20-2.

Note that the time duration of emission of a beam by the terminal 20 may be determined depending on the purpose of use of that beam. For example, the time duration of emission of a beam emitted to the base station 10 may be determined depending on the purpose of use, such as transmission of only a signal for positioning or transmission of a large amount of data.

Note that the present embodiment has been described with respect to an example in which the terminals 20 each serve as the wireless communication device 1, which is a transmitting entity, and the base stations 10 each serve as the communication peer device 2, which is a receiving entity. However, the present embodiment is not limited to such an example. For example, the communication peer device 2 may be the HAPS 40 such as a satellite or an airplane. In a case in which the HAPS 40 is the communication peer device 2, the HAPS 40 transmits information received from the terminal 20 to a terrestrial station, and the terrestrial station transmits beam information to the terminal 20 via the HAPS 40. The terminal 20 may transmit the beam information to the HAPS 40 directly or via a relay station. Use of a relay station may require power amplification. The terrestrial station may be the base station 10, the control station 50, or the server 30, or a combination of portions of the functionality of the base station 10, of the control station 50, and/or of the server 30.

Fourth Embodiment

Figure 23:
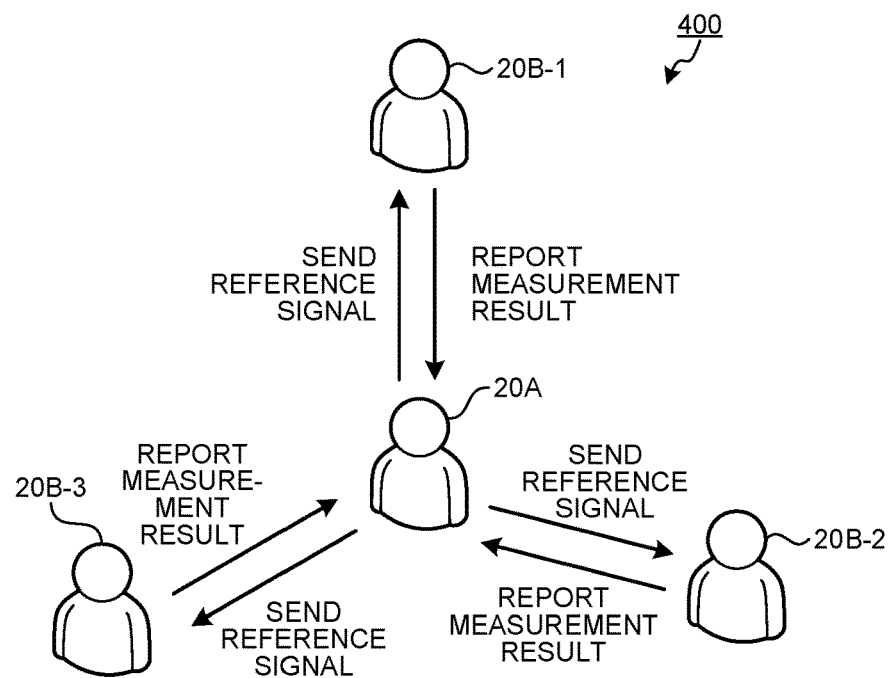
FIG. 23 is a diagram illustrating a configuration of a wireless communication system according to a fourth embodiment.

FIG. 23 is a diagram illustrating a configuration of a wireless communication system 400 according to a fourth embodiment. The fourth embodiment will describe the wireless communication system 400, in which communication devices of the same type exchange beam information with each other. The wireless communication system 400 includes a transmitting terminal 20A and receiving terminals 20B-1, 20B-2, and 20B-3. Note that the transmitting terminal 20A and the receiving terminals 20B-1, 20B-2, and 20B-3 are each an example of the terminal 20, and are each configured the same as the terminal 20 illustrated in FIG. 19. The reception processing unit 24 receives a signal from another one of the terminals 20. The signal from another terminal 20 may, for example, include a beam number for use in transmission. The transmitting terminal 20A is a terminal 20 that triggers starting of communication, and the receiving terminals 20B-1, 20B-2, and 20B-3 are each a terminal 20 that responds to the notification of starting of communication provided by the transmitting terminal 20A.

Note that although FIG. 23 illustrates the communication devices of the same type as the terminals 20, the present embodiment is not limited to such an example. For example, the communication devices of the same type may be the HAPSs 40 such as satellites, or the base stations 10.

Exchanging beam information also between communication devices of the same type enables the communication devices of the same type to communicate with each other or perform positioning on each other. For example, exchanging beam information between satellites enables a backhaul line to be established. In addition, exchanging beam information between base stations 10 enables a backhaul line to be established between a satellite and a terrestrial station.

The following description will describe an example of exchanging beam information between terminals 20. There is no particular limitation on the type of the terminals 20. The terminal 20 may be a device such as a smartphone, or an on-board communication instrument for use in wireless communication, which is on board a mobile object such as an automobile or a train. The communication between terminals 20 described below includes communication between smartphones, communication between on-board communication instruments, communication between a smartphone and an on-board communication instrument, and the like. Terminals 20 can communicate with each other, and a terminal 20 in the coverage area and a user outside the coverage area can also communicate with each other. Terminals 20 can communicate with each other, so that positioning can be performed between the terminals 20.

The transmitting terminal 20A broadcasts a notification of starting of communication to the multiple receiving terminals 20B-1, 20B-2, and 20B-3. The position of a resource in time and frequency for the channel for use in broadcasting is predetermined. The receiving terminals 20B-1, 20B-2, and 20B-3 each periodically check whether a signal exists on the predefined resource, and determine that notification of starting of communication has been provided when a signal exists. Note that the transmitting terminal 20A transmits a broadcast signal over a broad beam to facilitate receiving of the broadcast signal by the receiving terminals 20B-1, 20B-2, and 20B-3. For example, the transmitting terminal 20A may transmit a broadcast signal using a broadcast channel for sidelink, such as a physical sidelink broadcast channel (PSBCH) used in 3GPP.

Note that the transmitting terminal 20A may broadcast a notification of starting of communication to unspecified number of terminals 20, to terminals 20 belonging to a predefined group, or to a single terminal 20.

In addition, a process to discover the terminals 20 that will be communication peers may be performed before broadcasting. For example, 3GPP provides a process called "Discovery", which is performed by the transmitting terminal 20A to find the receiving terminals 20B-1, 20B-2, and 20B-3 with which the transmitting terminal 20A is to communicate. In the "Discovery" process, the transmitting terminal 20A allocates predefined information to a predefined time-frequency area, and the receiving terminals 20B-1, 20B-2, and 20B-3 each periodically observe the foregoing predefined time-frequency area. Note that the predefined time-frequency area and the content of the predefined information may be set by the base station 10, by the control station 50, or by the server 30. In addition, the predefined time-frequency area and the content of the predefined information may be given predetermined values in the form of default parameters. In a case in which predetermined values are used, values preset in a memory area of the terminal 20 or the like is referred to. Such use of predefined parameters allows elimination of the process of transmitting information required in synchronization from the transmitting terminal 20A to the receiving terminals 20B-1, 20B-2, and 20B-3, and thus enables the time required for synchronization operation to be reduced.

Note that in an example of 3GPP, the term resource refers to a set of resource elements, each of which is a unit in frequency in one temporal unit of orthogonal frequency division multiplexing (OFDM). For example, when the frequency carrier in one OFDM symbol has a 15 kHz spacing, and the OFDM symbol has a bandwidth of 15 MHz, this means that one OFDM symbol corresponds to 1000 carriers, i.e., 1000 resource elements. A resource is a set of multiple resource elements, and may extend over multiple symbols.

When the transmitting terminal 20A broadcasts a notification of starting of communication to the multiple receiving terminals 20B-1, 20B-2, and 20B-3 as described above, the transmitting terminal 20A and the multiple receiving terminals 20B-1, 20B-2, and 20B-3 each start preparation for communication. At this time, the transmitting terminal 20A and each of the multiple receiving terminals 20B-1, 20B-2, and 20B-3 perform a process of aligning the directions of beams with each other to optimize the power consumption at a frequency in or around FR2 or the like. Specifically, the transmitting terminal 20A transmits a reference signal to each of the multiple receiving terminals 20B-1, 20B-2, and 20B-3. The transmitting terminal 20A performs this operation by beam sweeping, in which the transmitting terminal 20A transmits multiple reference signals while switching between beam directions. Each of the multiple receiving terminals 20B-1, 20B-2, and 20B-3 measures the received power of each of the multiple reference signals, and reports the measurement results to the transmitting terminal 20A. Note that examples of the measurement result include the received power, the receiving direction, the reception time, and the difference between the transmission time and the reception time.

Note that the detail of the reference signal used in beam sweeping may differ beam by beam, or a resource that differs in time and frequency may be used for each beam. The detail of the reference signal may be, for example, a primary sidelink synchronization signal (PSSS), a secondary sidelink synchronization signal (SSSS), a sidelink synchronization signal (SLSS), a PSBCH, or the like, used for sidelink in 3GPP.

By using the information on the received power of each beam reported from each of the receiving terminals 20B-1, 20B-2, and 20B-3, the transmitting terminal 20A can measure the relative position of each of the receiving terminals 20B-1, 20B-2, and 20B-3 relative to the transmitting terminal 20A. Note that a server 30 for use in positioning may be installed to perform positioning in the server 30. In addition, the transmitting terminal 20A may send the information on the received power of each beam reported from each of the receiving terminals 20B-1, 20B-2, and 20B-3 to the server 30 installed in the base station 10 or the like, and then allow the server 30 to perform positioning operation. In this operation, the maximum value of the received power may be sent rather than sending all the received powers to save the amount of information. Measurement of the relative position between the terminals 20 enables the terminals 20 to know the positions relative to each other with high accuracy without the necessity for a coordinate system or the like. For example, in a case in which the transmitting terminal 20A is an on-board communication instrument and is installed in a vehicle having autonomous driving capabilities, and the receiving terminals 20B-1, 20B-2, and 20B-3 act as obstacles, the vehicle can be driven while avoiding collision with these obstacles.

In addition, positioning using the multiple receiving terminals 20B-1, 20B-2, and 20B-3 enables positioning accuracy to be improved. Positioning using the multiple receiving terminals 20B-1, 20B-2, and 20B-3 enables the transmitting terminal 20A to also calculate an average value using the information on the received power reported from each of the multiple receiving terminals 20B-1, 20B-2, and 20B-3.

Figure 24:
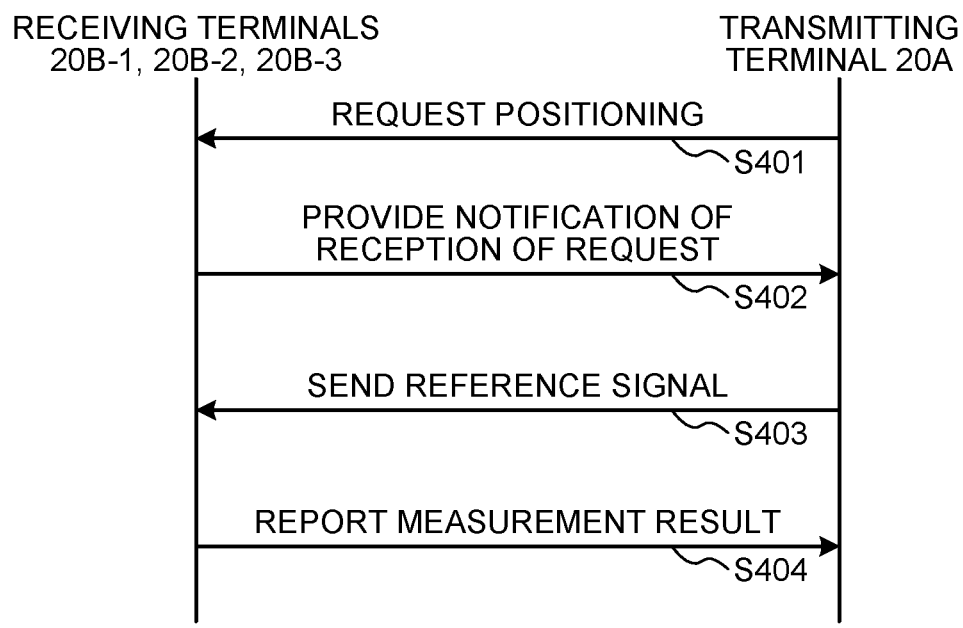
FIG. 24 is a sequence diagram for describing a first example of positioning operation performed by the wireless communication system illustrated in FIG. 23.

FIG. 24 is a sequence diagram for describing a first example of positioning operation performed by the wireless communication system 400 illustrated in FIG. 23. The transmitting terminal 20A sends a request for positioning to each of the receiving terminals 20B-1, 20B-2, and 20B-3 (step S401). Upon reception of the request for positioning, each of the receiving terminals 20B-1, 20B-2, and 20B-3 notifies the transmitting terminal 20A of reception of the request (step S402).

The transmitting terminal 20A transmits a reference signal to each of the receiving terminals 20B-1, 20B-2, and 20B-3 (step S403). Note that the transmitting terminal 20A performs beam sweeping for each of the receiving terminals 20B-1, 20B-2, and 20B-3 to transmit reference signals and select a beam suitable for transmission or reception. Each of the receiving terminals 20B-1, 20B-2, and 20B-3 reports the measurement result on the reference signal to the transmitting terminal 20A (step S404). The transmitting terminal 20A measures the relative positions of the respective receiving terminals 20B-1, 20B-2, and 20B-3 based on the measurement results reported. Note that the transmitting terminal 20A may start positioning without sending a request for positioning to the receiving terminal 20B-1, 20B-2, or 20B-3. For example, the transmitting terminal 20A may send a reference signal to the multiple terminals 20 in a broadcast manner.

Figure 25:
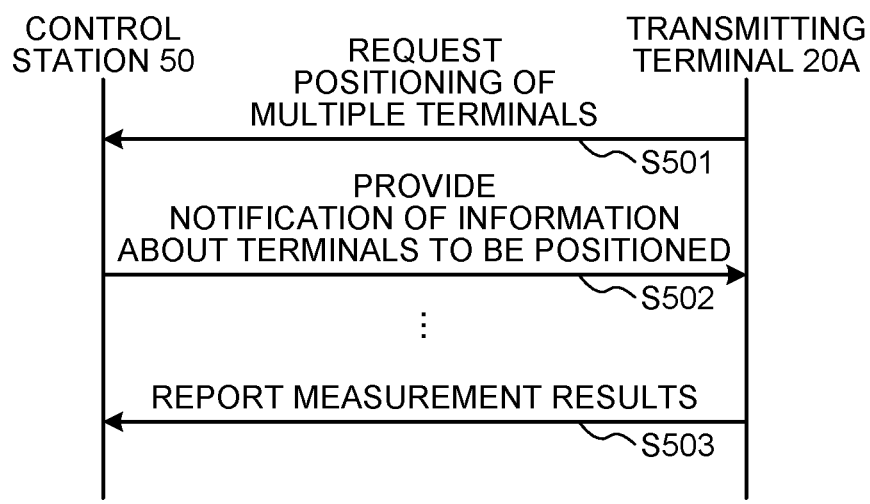
FIG. 25 is a sequence diagram for describing a second example of positioning operation performed by the wireless communication system illustrated in FIG. 23.

FIG. 25 is a sequence diagram for describing a second example of positioning operation performed by the wireless communication system 400 illustrated in FIG. 23. The second example uses the control station 50 to perform positioning of the multiple terminals 20. The transmitting terminal 20A sends a request for positioning of the multiple terminals 20 to the control station 50 (step S501). The control station 50 notifies the transmitting terminal 20A of information about the terminals to be positioned (step S502). The transmitting terminal 20A reports the measurement results to the control station 50 (step S503). Although FIG. 25 does not illustrate the process performed between the transmitting terminal 20A and each of the receiving terminals 20B-1, 20B-2, and 20B-3, the process as illustrated in FIG. 24, for example, is performed. The control station 50 measures the relative position of each of the receiving terminals 20B-1, 20B-2, and 20B-3 relative to the transmitting terminal 20A based on the measurement results reported. The control station 50 may instruct the transmitting terminal 20A to start positioning.

Note that the signal to be sent for beam sweeping as described above is desirably a signal densely mapped on a time-frequency resource. Although a signal for synchronization purpose such as an SLSS or a PSBCH may be used, use of a reference signal dedicated to positioning purpose is desirable for improvement in positioning accuracy. For example, a reference signal for sidelink such as a sidelink positioning reference signal (SPRS) may be used. The setting of SPRS may be a value that is set from a positioning server or a predetermined value that has been set in advance. Note that an identifier corresponding to a resource, a resource set, or multiple resource sets may be used for setting of an SPRS.

Note that a parameter of a higher layer relating to a higher-layer sidelink channel may be managed under names of resource setting, resource set, and resource. Use of such hierarchical parameter management enables a reduction in the overhead. Multiple resources are included in a resource set, and multiple resource sets are included in multiple resource settings. Resource setting may be named PRS-ResourceConfig in a higher layer. Resource setting, which functions to manage the resource sets, includes information such as identification numbers of the respective resource sets. Resource setting may be managed according to TS 38.331.

The movement in time domain, of the resources included in a resource set, e.g., periodic, semi-persistent, aperiodic, or the like, may be specified in a resource setting. When the movement in time domain is specified in resource setting, all the resources included in that resource setting are set to the same setting. For example, a parameter for multiple resources is defined in a resource set. For example, a resource set includes identification numbers of the respective resources, and the like. In addition, when an aperiodic PRS is included, indication may be provided indicating that the PRSs included in that resource set are all aperiodic. The slot, the position in frequency, and the like where the PRS will be mapped may be specified in the resource.

Alternatively, instead of using a hierarchical parameter, a PRC parameter for PRS setting may be introduced. For example, an RRC parameter may be used that includes the density of PRSs in time or frequency domain as one specified in PRS-config, and/or parameter information representing the operation in time domain such as periodic, semi-persistent, or aperiodic as described above.

When communication is performed with multiple terminals 20 using a beam, each of the receiving terminals 20 may be notified of how the beam is used. In this case, information that associates the pieces of beam information with one another may be broadcast. In addition, notification of information to be broadcast can be provided in multicast mode or in unicast mode. By knowing mutual beam usages, multiple terminals 20 can know the mutual relative positions, beam directions, and beam emission timings.

Figure 26:
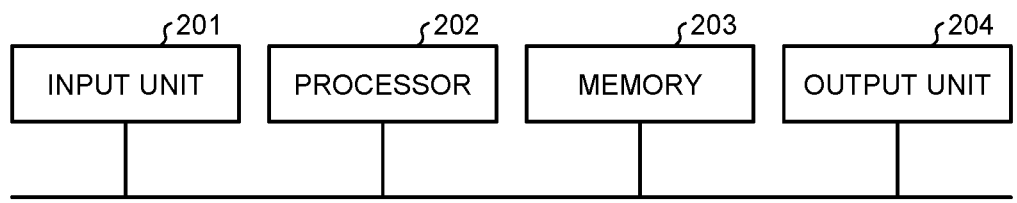
FIG. 26 is a diagram illustrating a first example of processing circuitry for implementing components of a base station, a terminal, a server, a HAPS, and a control station.

FIG. 26 is a diagram illustrating a first example of processing circuitry for implementing components of the base station 10, the terminal 20, the server 30, the HAPS 40, and the control station 50. FIG. 26 illustrates an example configuration in a case in which the processing circuitry is implemented by a control circuit including a processor. The processing circuitry illustrated in FIG. 26 includes an input unit 201, which is a reception unit for receiving data input from an external device, a processor 202, a memory 203, and an output unit 204, which is a transmission unit for transmitting data to an external device. The input unit 201 is an interface circuit that receives data input from outside the control circuit, and provides the data to the processor. The output unit 204 is an interface circuit that transmits data from the processor 202 or from the memory 203 to the outside of the control circuit.

The control unit 11, the transmission signal generation unit 12, and the reception signal decoding unit 15 of the base station 10; the control unit 21, the transmission signal generation unit 22, and the reception signal decoding unit 25 of the terminal 20; the functionality of the server 30; the functionality of the HAPS 40; and the functionality of the control station 50 are implemented by the processor 202 reading and executing a computer program stored in the memory 203 for implementing each of these components. The memory 203 is also used as a temporary memory in processing performed by the processor 202. Note that the transmission processing unit 13 and the reception processing unit 14 among the components of the base station 10 and the transmission processing unit 23 and the reception processing unit 24 among the components of the terminal 20 are implemented by an array antenna and a signal processing circuit.

The processor 202 is a central processing unit (CPU) (also known as processing unit, computing unit, microprocessor, microcomputer, processor, and digital signal processor (DSP)). The memory 203 is, for example, a non-volatile or volatile semiconductor memory such as a random access memory (RAM), a read-only memory (ROM), a flash memory, an erasable programmable read-only memory (EPROM), or an electrically erasable programmable read-only memory (EEPROM) (registered trademark); a magnetic disk, a flexible disk, an optical disk, a compact disc, a MiniDisc, a digital versatile disk (DVD), or the like.

Figure 27:
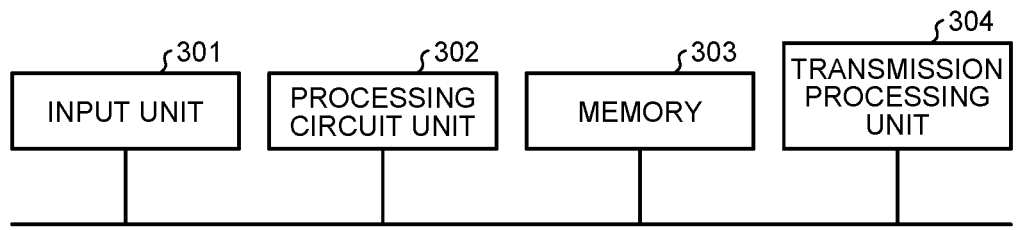
FIG. 27 is a diagram illustrating a second example of processing circuitry for implementing components of the base station, the terminal, the server, the HAPS, and the control station.

FIG. 27 is a diagram illustrating a second example of processing circuitry for implementing components of the base station 10, the terminal 20, the server 30, the HAPS 40, and the control station 50. FIG. 27 illustrates an example configuration in a case in which the processing circuitry is implemented by a dedicated hardware element. The processing circuitry illustrated in FIG. 27 includes an input unit 301, a processing circuit unit 302, a memory 303, and a transmission processing unit 304. The input unit 301 receives data input from an external device. The processing circuit unit 302 is a single circuit, a set of multiple circuits, a programmed processor, a parallel programmed processor, an application specific integrated circuit (ASIC), a field programmable gate array (FPGA), or a combination thereof. The memory 303 is a memory similar to the memory 203 illustrated in FIG. 26. The transmission processing unit 304 is a transmission unit for transmitting data to an external device.

In a case in which the base station 10 is implemented by the processing circuitry illustrated in FIG. 27, the control unit 11, the transmission signal generation unit 12, the transmission processing unit 13, the reception processing unit 14, and the reception signal decoding unit 15 of the base station 10 are implemented using the processing circuit unit 302. In a case in which the terminal 20 is implemented by the processing circuitry illustrated in FIG. 27, the control unit 21, the transmission signal generation unit 22, the transmission processing unit 23, the reception processing unit 24, and the reception signal decoding unit 25 of the terminal 20 are implemented using the processing circuit unit 302.

Note that the base station 10 may be implemented such that one or some of the components of the base station 10 are implemented in the processing circuitry illustrated in FIG. 26, and the other component(s) thereof is(are) implemented in the processing circuitry illustrated in FIG. 27.

Note that in a case in which the functionality of the base station 10, the terminal 20, the server 30, the HAPS 40, and the control station 50 is partly implemented in the processing circuitry illustrated in FIG. 26, the programs to be executed by the processor 202 may be supplied via a communication line or from a storage medium that stores the programs.

A wireless communication device according to the present disclosure is advantageous in being communicable with each of multiple communication peer devices through switching between beam directions in a time division manner, and being capable of reducing or preventing occurrence of interference between beams.

The configurations described in the foregoing embodiments are merely examples of various aspects. These configurations may be combined with a known other technology, and moreover, a part of such configurations may be omitted and/or modified without departing from the spirit.

What is claimed is:

1. A wireless communication device comprising:
    transmission processing circuitry communicable with each of a plurality of communication peer devices through switching between beam directions in a time division manner; and
    control circuitry to allow beam information representing how beams are used by the plurality of communication peer devices with which the transmission processing circuitry is communicable to be shared by the plurality of communication peer devices, wherein
    the beam information includes information that identifies a plurality of emission timings when the transmission processing circuitry emits beams to the respective plurality of communication peer devices, and
    the information that identifies the plurality of emission timings is an interval between emissions of a beam emitted by the transmission processing circuitry.

2. The wireless communication device according to claim 1, wherein the beam information includes information that identifies a plurality of beam directions for use by the transmission processing circuitry to communicate with the respective plurality of communication peer devices.

3. The wireless communication device according to claim 1, wherein the beam information includes transmitted power used for emission of the beam in each of the plurality of the beam directions.

4. The wireless communication device according to claim 1, wherein the beam information is multicast.

5. The wireless communication device according to claim 1, wherein the control circuitry determines a beam direction to be used for communication with each of the plurality of communication peer devices, based on received power measured by the plurality of communication peer devices by performing beam sweeping.

6. The wireless communication device according to claim 5, wherein the control circuitry performs positioning of the communication peer devices based on the received power.

7. The wireless communication device according to claim 1, wherein
    in a case in which the communication peer device is on board a mobile object, the transmission processing circuitry switches a beam direction to be used for communication with the communication peer device on board the mobile object according to movement of the mobile object, and
    the control circuitry allows a plurality of beam directions that are used by the transmission processing circuitry for communication with the communication peer device on board the mobile object and a timing of switching of a beam direction used by the transmission processing circuitry, to be shared by the plurality of communication peer devices.

8. The wireless communication device according to claim 1, wherein
    in a case in which the wireless communication device is on board a mobile object, the transmission processing circuitry switches a beam direction to be used for communication with each of the plurality of communication peer devices according to movement of the mobile object, and
    the control circuitry allows a plurality of beam directions that are used by the transmission processing circuitry for communication with each of the plurality of communication peer devices and a timing of switching of a beam direction used by the transmission processing circuitry, to be shared by the plurality of communication peer devices.

9. The wireless communication device according to claim 1, wherein when the wireless communication device is no longer communicable with at least one of the communication peer devices, the control circuitry performs muting operation, in which beam emission is inhibited at an emission timing associated with the at least one of the communication peer devices with which the wireless communication device is no longer communicable.

10. The wireless communication device according to claim 1, wherein
the wireless communication device is a terminal or a base station, and
each of the plurality of communication peer devices is a terminal or a base station.

11. The wireless communication device according to claim 1, wherein the wireless communication device and the plurality of communication peer devices are each a terminal.

12. The wireless communication device according to claim 1, wherein
the wireless communication device is a terminal, and
the beam information is shared among a plurality of the wireless communication devices.

13. A wireless communication system comprising: a wireless communication device; and a plurality of communication peer devices communicable with the wireless communication device, wherein
the wireless communication device includes
transmission processing circuitry communicable with each of the plurality of communication peer devices through switching between beam directions in a time division manner, and
control circuitry to allow beam information representing how beams are used by the plurality of communication peer devices with which the transmission processing circuitry is communicable to be shared by the plurality of communication peer devices,
each of the plurality of communication peer devices controls communication with the wireless communication device based on the beam information,
the beam information includes information that identifies a plurality of emission timings when the transmission processing circuitry emits beams to the respective plurality of communication peer devices, and
the information that identifies the plurality of emission timings is an interval between emissions of a beam emitted by the transmission processing circuitry.

14. The wireless communication system according to claim 13, further comprising:
a subordinate device with which at least one of the plurality of communication peer devices communicates through switching between beam directions in a time division manner, wherein beam information representing how beams are used by the communication peer device and beam information representing how beams are used by the subordinate device are associated with each other in a hierarchical structure.

15. A control circuit for controlling a wireless communication device communicable with each of a plurality of communication peer devices through switching between beam directions in a time division manner, the control circuit causing the wireless communication device to perform:
allowing beam information representing how beams are used by the plurality of communication peer devices that are communicable, to be shared by the plurality of communication peer devices, wherein
the beam information includes information that identifies a plurality of emission timings when the wireless communication device emits beams to the respective plurality of communication peer devices, and
the information that identifies the plurality of emission timings is an interval between emissions of a beam emitted by the wireless communication device.

16. A non-transitory storage medium storing a program for controlling a wireless communication device communicable with each of a plurality of communication peer devices through switching between beam directions in a time division manner, the program causing the wireless communication device to perform:
allowing beam information representing how beams are used by the plurality of communication peer devices that are communicable, to be shared by the plurality of communication peer devices, wherein
the beam information includes information that identifies a plurality of emission timings when the wireless communication device emits beams to the respective plurality of communication peer devices, and
the information that identifies the plurality of emission timings is an interval between emissions of a beam emitted by the wireless communication device.

17. A wireless communication method comprising:
allowing, performed by a wireless communication device communicable with each of a plurality of communication peer devices through switching between beam directions in a time division manner, beam information representing how beams are used by the plurality of communication peer devices that are communicable, to be shared by the plurality of communication peer devices, wherein
the beam information includes information that identifies a plurality of emission timings when the wireless communication device emits beams to the respective plurality of communication peer devices, and
the information that identifies the plurality of emission timings is an interval between emissions of a beam emitted by the wireless communication device.

* * * * *